United States Patent [19]
Okura et al.

[11] Patent Number: 6,077,878
[45] Date of Patent: *Jun. 20, 2000

[54] FOAM MADE FROM MODIFIED POLYPROPYLENE RESIN AND PROCESS FOR THE PRODUCTION THEREOF

[75] Inventors: Tetsuo Okura, Ibaraki; Mitsuharu Kourogi, Settsu; Yoshifumi Fukui, Kobe; Hesun Kim, Kobe; Haruo Tomita, Kobe; Osamu Miyama, Settsu; Taizo Aoyama, Takasago, all of Japan

[73] Assignee: Kanegafuchi Kagaku Kogyo Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,840

[22] PCT Filed: Jul. 19, 1996

[86] PCT No.: PCT/JP96/02037

§ 371 Date: Dec. 17, 1997

§ 102(e) Date: Dec. 17, 1997

[87] PCT Pub. No.: WO97/05183

PCT Pub. Date: Feb. 13, 1997

[30] Foreign Application Priority Data

Jul. 25, 1995 [JP] Japan .................................. 7-189614
Oct. 25, 1995 [JP] Japan .................................. 7-277834

[51] Int. Cl.$^7$ ................................................... C08J 9/00
[52] U.S. Cl. ............................. 521/139; 521/56; 521/59; 521/60; 521/79; 521/81; 525/322
[58] Field of Search ............................... 521/139, 59, 56, 521/60, 79, 81; 525/322

[56] References Cited

U.S. PATENT DOCUMENTS

| 4,303,756 | 12/1981 | Kajimura et al. | 521/59 |
| 4,303,757 | 12/1981 | Kajimura et al. | 521/59 |
| 4,622,347 | 11/1986 | Fudge | 521/81 |
| 4,657,937 | 4/1987 | Kuwabara et al. | 521/56 |

FOREIGN PATENT DOCUMENTS

| 0 718 328 | 6/1996 | European Pat. Off. . |
| 54-63194 | 5/1979 | Japan . |
| 59-18714 | 1/1984 | Japan . |
| 61-228034 | 10/1986 | Japan . |
| 3-290444 | 12/1991 | Japan . |
| 1 458 866 | 12/1976 | United Kingdom . |

OTHER PUBLICATIONS

Patent Abstracts of Japan vol. 015, No. 297 (C–0854), Jul. 29, 1991 & JP 03 10944 A (Hitachi Chemical Co Ltd), May 9, 1991.

*Primary Examiner*—Morton Foelak
*Attorney, Agent, or Firm*—Armstrong, Westerman, Hattori, McLeland and Naughton

[57] ABSTRACT

The present invention relates to a foamed article comprising a modified polypropylene resin which is a graft copolymer of a polypropylene resin and an aromatic vinyl monomer and has an average number of the grafted aromatic vinyl chains of not less than 1 in one molecule of the graft copolymer and a weight average molecular weight of the grafted aromatic vinyl chains of not less than 200, and relates to a process for preparation thereof. According to the present invention, the foamed article comprising the polypropylene resin and having a high closed cell content, a high expansion ratio and good external appearance can be provided.

4 Claims, 4 Drawing Sheets

FOAM MADE FROM MODIFIED POLYPROPYLENE RESIN AND PROCESS FOR THE PRODUCTION THEREOF

TECHNICAL FIELD

The present invention relates to a foamed article comprising a polypropylene resin graft-copolymerized with an aromatic vinyl monomer (hereinafter may be referred to as "modified polypropylene resin"), and a process for preparation thereof. Particularly the present invention relates to a foamed article comprising the modified polypropylene resin obtained by melt-kneading a polypropylene resin (the polypropylene resin before graft-copolymerized with aromatic vinyl monomer may be hereinafter referred to as "raw polypropylene resin") and aromatic vinyl monomer in the presence of a radical polymerization initiator, and relates to a process for preparation thereof.

BACKGROUND ART

Foamed articles are in general light in weight and excellent in heat-insulating property and energy absorption property against external stress such as impact force, and therefore, are widely used for various applications such as heat-insulating materials, cushion materials for external stress, core materials and food containers. Also as the starting materials for the foamed articles, there are various ones such as polystyrene resin, polyurethane resin and polyethylene resin.

Further as the starting materials for the foamed articles, employment of a polypropylene resin which is excellent in solvent resistance and advantageous from the viewpoint of cost and has a high melting point and a high modulus of elasticity, can be considered. However since the polypropylene resin is a crystalline resin, its melt viscosity and melt tensile strength are low. For that reason, strength of a cell wall formed when expanding under molten condition is not sufficient, and the cell wall is apt to be broken. Also when the temperature of the polypropylene resin in the molten state is decreased in order to make sufficient the strength of the cell wall, a melt viscosity is increased rapidly. Therefore it was very difficult to control the melt viscosity to the value suitable for expanding by adjusting a melting temperature of the polypropylene resin. For these reasons, it was difficult to obtain a foamed article, which has a high closed cell content, by using a conventional polypropylene resin.

As approaches to solve the problem of easily causing the breakage of the cell wall formed when expanding the polypropylene resin, there have been proposed, for example, a method of expanding a blend of polypropylene and polybutene-1 (JP-B-40167/1981), a method of expanding a blend of polypropylene and polyethylene (JP-B-59252/1982) and a method of crosslinking a polypropylene resin with a crosslinking agent (JP-A-254142/1988).

However, even with those methods, the above-mentioned problem of the cell walls being easily broken could not be sufficiently solved, and therefore, it was difficult to obtain foamed articles having a high expansion ratio and a high closed cell content. Also those foamed articles have a drawback of being difficult to be recycled because a large amount of resins other than the polypropylene resin is mixed therein or because the articles are difficult to melt due to intermolecular crosslinking.

Also in recent years, many methods of making a sheet-like foamed article by using, as a resin material, polypropylene having a structure of long branched chains (JP-A-506875/1993, JP-A-363227/1992, etc.). However these methods have drawbacks such that since the specific resin is used, starting materials therefor are expensive and thus the obtained foamed articles are less applicable to various uses.

In case where such a polypropylene resin is used, though there is seen an improvement of foamability property, the degree of the improvement is not enough. Further in case where a thick foamed article is made by using such a polypropylene resin, an effect of increasing the strength of the cell wall when cooled from outside thereof is decreased depending on the increase of thickness. Therefore, it was difficult to obtain a foamed article having a thickness of not less than 5 mm and suitable properties as mentioned above.

An object of the present invention is to provide a foamed article comprising the modified polypropylene resin and having a high expansion ratio, high closed cell content and good external appearance.

Another object of the present invention is to provide a thick foamed article comprising the modified polypropylene resin and having a high expansion ratio, high closed cell content and good external appearance.

DISCLOSURE OF THE INVENTION

The present invention relates to a foamed article comprising the modified polypropylene resin which is a graft copolymer of the raw polypropylene resin and an aromatic vinyl monomer, wherein the average number of grafted aromatic vinyl chains in one molecule of the graft copolymer is at least one and the weight average molecular weight of the grafted aromatic vinyl chains is not less than 200.

It is preferable that a branching-parameter (g') of the above-mentioned modified polypropylene resin is less than 1, more preferably less than 0.8.

Also it is preferable that the elongational viscosity of the above-mentioned modified polypropylene resin in the molten state drastically increases with increase of an amount of strain.

Also the present invention relates to a foamed article having an apparent density of 0.01 to 0.3 g/cm$^3$ and a thickness of 5 to 100 mm.

It is preferable that the average number of the grafted aromatic vinyl chains is from 9 to 100, and that the weight average molecular weight of the grafted aromatic vinyl chains is from 300 to 30,000. Also it is preferable that the aromatic vinyl monomer is styrene, methylstyrene or divinylbenzene and that a molecular weight distribution (Z average molecular weight (Mz)/weight average molecular weight (Mw)) of the above-mentioned modified polypropylene resin is not less than 3, more preferably not less than 3.5.

Also it is preferable that an equilibrium compliance of the above-mentioned modified polypropylene resin is not less than $10 \times 10^{-4}$ m$^2$/N and a recoverable shear strain per unit stress of the modified polypropylene resin at a shear rate of 1 sec$^{-1}$ is not less than $3 \times 10^{-4}$ m$^2$/N.

The above-mentioned modified polypropylene resin may comprise the raw polypropylene resin, an aromatic vinyl monomer and other vinyl monomer copolymerizable with the aromatic vinyl monomer.

Also the present invention relates to a process for preparing a foamed article by melt-kneading a foaming agent and the modified polypropylene resin which is a graft copolymer of the raw polypropylene resin and an aromatic vinyl monomer and has the average number of the grafted aromatic vinyl chains of at least one in one molecule of the graft copolymer and the weight average molecular weight of the grafted aromatic vinyl chains of not less than 200, and then extruding.

The present invention also relates to a process for preparing a foamed article comprising the steps of:

melt-kneading a thermally decomposable foaming agent which generates vapor by thermal decomposition and the modified polypropylene resin which is a graft copolymer of the raw polypropylene resin and an aromatic vinyl monomer and has the average number of the grafted aromatic vinyl chains of at least one in one molecule of the graft copolymer and the weight average molecular weight of the grafted aromatic vinyl chains of not less than 200, at a temperature where the thermally decomposable foaming agent does not generate the vapor substantially, forming the melt-kneaded composition of the modified polypropylene resin and thermally decomposable foaming agent into a sheet, and heating the sheet of melt-kneaded composition to at least a temperature where the thermally decomposable foaming agent generates the vapor to expand the sheet.

Also the present invention relates to a process for preparing the foamed article, comprising graft-copolymerizing the raw polypropylene resin and an aromatic vinyl monomer through melt-kneading in the presence of a radical polymerization initiator.

In the above-mentioned processes, it is preferable to conduct the melt-kneading by using the radical polymerization initiator in an amount of 0.1 to 10 parts by weight, more preferably 0.5 to 5 parts by weight on the basis of 100 parts by weight of the raw polypropylene resin.

The preferred radical polymerization initiator is a peroxyketal, a dialkyl peroxide, a diacyl peroxide or a peroxyester.

Also in the above-mentioned processes, it is preferable to conduct the melt-kneading by using the aromatic vinyl monomer in an amount of 0.1 to 100 parts by weight, more preferably 1 to 50 parts by weight on the basis of 100 parts by weight of the raw polypropylene resin.

The preferred aromatic vinyl monomer is styrene, methylstyrene or divinylbenzene.

Also in the above-mentioned processes, the branching-parameter (g') of the modified polypropylene resin is preferably less than 1, more preferably less than 0.8.

Also in the above-mentioned processes, it is preferable that the elongational viscosity of the modified polypropylene resin in the molten state drastically increases as an amount of stain increases.

In the above-mentioned processes, it is preferable that the average number of the grafted aromatic vinyl chains is from 2 to 100 and the weight average molecular weight of the grafted aromatic vinyl chains is from 300 to 30,000.

Also the present invention relates to a process for preparing the above-mentioned respective foamed articles having an apparent density of 0.01 to 0.3 g/cm$^3$ and a thickness of 5 to 100 mm.

Also in the above-mentioned processes, the molecular weight distribution (Z average molecular weight (Mz)/ weight average molecular weight (Mw)) of the above-mentioned modified polypropylene resin is preferably not less than 3, more preferably not less than 3.5.

In the above-mentioned processes, it is preferable that the equilibrium compliance of the modified polypropylene resin is not less than $10 \times 10^{-4}$ m$^2$/N and the recoverable shear strain per unit stress of the modified polypropylene resin at a shear rate of 1 sec$^{-1}$ is not less than $3 \times 10^{-4}$ m$^2$/N.

Also in the above-mentioned processes, the raw polypropylene resin may be graft-copolymerized with the aromatic vinyl monomer and other vinyl monomer copolymerizable with the aromatic vinyl monomer, through melt-kneading in the presence of a radical polymerization initiator to give the modified polypropylene resin.

BEST MODE FOR CARRYING OUT THE INVENTION

Figure 1:
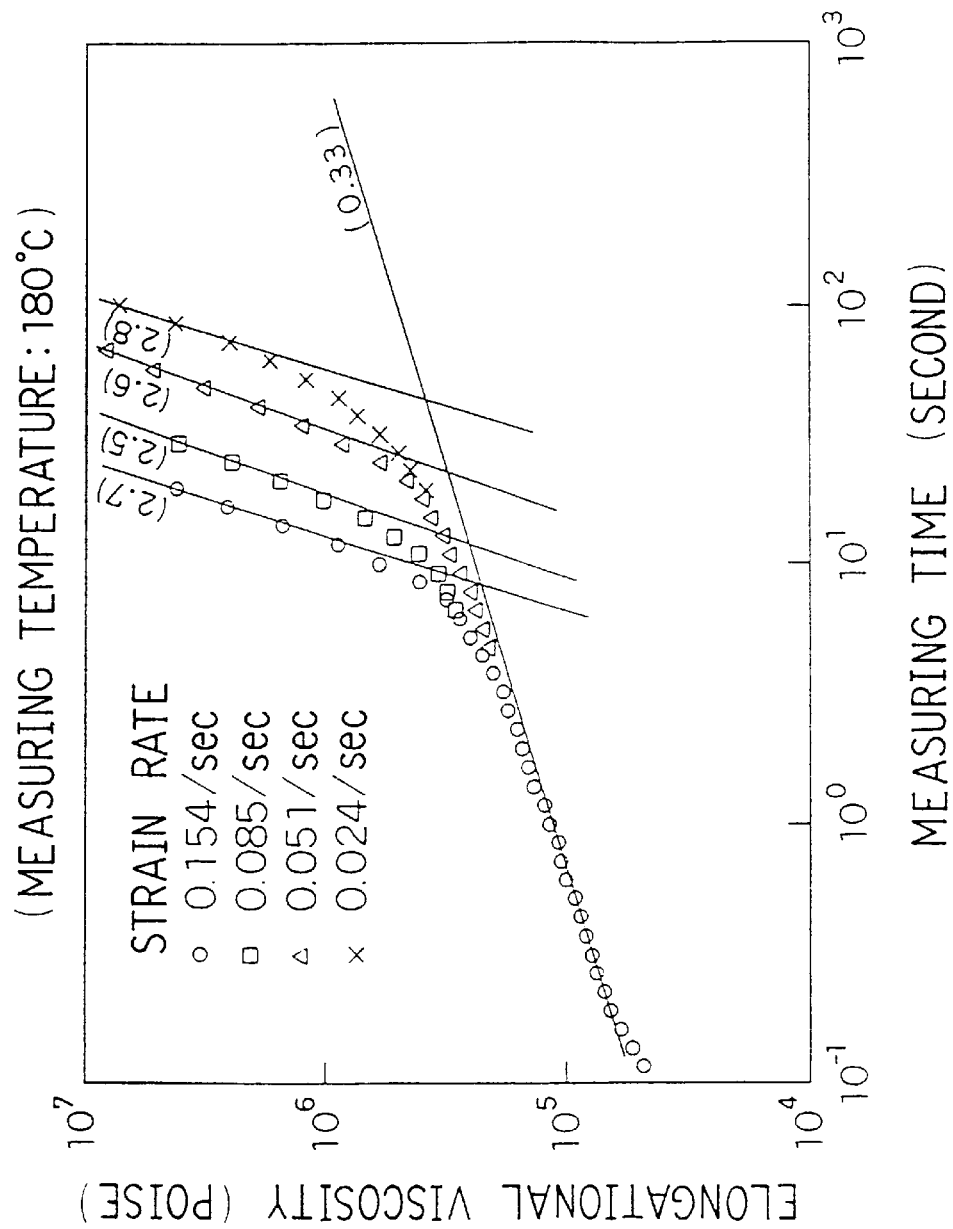
FIG. 1 is a graph explaining a relation of an elongational viscosity of the modified polypropylene resin according to the present invention in the molten state and a measuring time (strain rate).

The modified polypropylene resin in the present invention is a graft copolymer obtained by graft-copolymerizing the raw polypropylene resin with an aromatic vinyl monomer.

The thus obtained modified polypropylene resin is capable of elastic deformation greatly at the time of melting. In case where a foamed article is made by using the modified polypropylene resin, the cell wall formed at the expansion is not easily broken. Therefore, by using the modified polypropylene resin in the present invention, a foamed article having suitable mechanical properties, high expansion ratio, high closed cell ratio and good external appearance can be formed.

Examples of the raw polypropylene resin are crystalline polymers such as propylene homopolymer, a block copolymer of propylene and other monomer and a random copolymer of propylene and other monomer. Among them, propylene homopolymer is preferable from the viewpoints of having a high rigidity and being inexpensive, and the block copolymer of propylene and other monomer is preferable because it is high in both rigidity and impact resistance. In case where the raw polypropylene resin is a block copolymer or random copolymer of propylene and other monomer, the content of the contained propylene monomer component is preferably not less than 75% by weight, more preferably not less than 90% by weight on the basis of the whole weight in order to maintain high crystallinity, high rigidity and excellent chemical resistance which are features of the polypropylene resin.

In the above-mentioned raw polypropylene resin, examples of the monomer copolymerizable with propylene are one or more monomers selected from the group consisting of ethylene, α-olefin, cyclic olefin, diene monomer and vinyl monomer. And ethylene, α-olefin or diene monomer is preferable because such a monomer is easily copolymerizable with propylene and inexpensive.

Examples of the above-mentioned α-olefin copolymerizable with propylene are those having 4 to 12 carbon atoms, such as butene-1, isobutene, pentene-1, 3-methyl-butene-1, hexene-1, 3-methyl-pentene-1, 4-methylpentene-1, 3, 4-dimethyl-butene-1, heptene-1, 3-methylhexene-1, octene-1 and decene-1. Also examples of the above-mentioned cyclic olefin copolymerizable with propylene are cyclopentene, norbornene, 1, 4, 5, 8-dimetano-1,2,3,4, 4a, 8, 8a-6-octahydronaphthalene and the like. Examples of the above-mentioned diene monomer copolymerizable with propylene are 5-methylene-2-norbornene, 5-ethylidene-2-norbornene, 1, 4-hexadiene, methyl-1, 4-hexadiene, 7-methyl-1, 6-octadiene and the like. Also examples of the above-mentioned vinyl monomer copolymerizable with propylene are vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, divinylbenzene and the like.

Among the above-mentioned monomers, ethylene or butene-1 is further preferable because it is inexpensive.

The molecular weight (weight average molecular weight) of the raw polypropylene resin is preferably in the range of 50,000 to 2,000,000 because the resin is easily available from industrial point of view, and more preferably in the range of 100,000 to 1,000,000 because the resin is inexpensive.

The molecular weight distribution (Mz/Mw) of the raw polypropylene resin is preferably not less than 2 because the resin is easily available from industrial point of view, and more preferably not less than 2.5 because it is easy to make the molecular weight distribution (Mz/Mw) of the modified polypropylene resin being not less than 3. The reason why not less than 3 of the molecular weight distribution (Mz/Mw) of the modified polypropylene resin is preferable is mentioned hereinafter.

To the raw polypropylene resin may be added, if necessary, other resin or rubber in the range not impairing effects of the present invention. Examples of the other resin and rubber are polyethylene; α-polyolefins such as polybutene-1, polyisobutene, polypentene-1 and polymethylpentene-1; ethylene/α-olefin copolymers or α-olefin/α-olefin copolymers such as an ethylene/propylene copolymer containing less than 75% by weight of propylene, ethylene/butene-1 copolymer and propylene/butene-1 copolymer containing less than 75% by weight of propylene; ethylene/60 -olefin/diene monomer copolymers or α-olefin/α-olefin/diene monomer copolymers such as an ethylene/propylene/5-ethylidene-2-norbornene copolymer containing less than 75% by weight of propylene; ethylene/vinyl monomer copolymers or olefin/vinyl monomer copolymers such as an ethylene/vinyl chloride copolymer, ethylene/vinylidene chloride copolymer, ethylene/acrylonitrile copolymer, ethylene/methacrylonitrile copolymer, ethylene/vinyl acetate copolymer, ethylene/acrylamide copolymer, ethylene/methacrylamide copolymer, ethylene/acrylic acid copolymer, ethylene/methacrylic acid copolymer, ethylene/maleic acid copolymer, ethylene/ethyl acrylate copolymer, ethylene/butyl acrylate copolymer, ethylene/methyl methacrylate copolymer, ethylene/maleic anhydride copolymer, ethylene/metal acrylate copolymer, etylene/metal methacrylate copolymer, ethylene/styrene copolymer, ethylene/methylstyrene copolymer and ethylene/divinylbenz ene copolymer; polydiene copolymers such as polybutadiene and polyisoprene; random copolymers of vinyl monomer and diene monomer such as a styrene/butadiene random copolymer; block copolymers of vinyl monomer, diene monomer and vinyl monomer such as a styrene/butadiene/styrene block copolymer; hydrogenated vinyl monomer/diene monomer random copolymers such as a hydrogenated styrene/butadiene random copolymer; hydrogenated vinyl monomer/diene monomer/vinyl monomer block copolymers such as a hydrogenated styrene/butadiene/styrene block copolymer; graft copolymers of vinyl monomer, diene monomer and vinyl monomer such as an acrylonitrile/butadiene/styrene graft copolymer and methyl methacrylate/butadiene/styrene graft copolymer; vinyl polymers such as polyvinyl chloride, polyvinylidene chloride, polyacrylonitrile, polyvinyl acetate, ethyl polyacrylate, butyl polyacrylate, methyl polymethacrylate and polystyrene; vinyl copolymers such as a vinyl chloride/acrylonitrile copolymer, vinyl chloride/vinyl acetate copolymer, acrylonitrile/styrene copolymer and methyl methacrylate/styrene copolymer; and the like.

The amount of those other resins or rubbers to be added to the raw polypropylene resin varies depending on kinds of the other resins or rubbers, and as mentioned above, may be in the range not impairing effects of the present invention. It is preferable that the amount is usually not more than about 25% by weight.

To the raw polypropylene resin may be added, if necessary, stabilizers such as antioxidant, metal deactivator, phosphorus type processing stabilizer, ultraviolet ray absorber, ultraviolet ray stabilizer and fluorescent whitening agent or additives such as crosslinking agent, chain transfer agent, nucleating agent, lubricant, plasticizer, filler, reinforcing agent, pigment, dye, flame retarder and antistatic agent in an amount not impairing effects of the present invention.

The raw polypropylene resins (there is a case where various additives are contained therein) may be in the form of particles or pellets, and the size and shape thereof are not particularly limited.

In case where the above-mentioned adding materials (other resins, rubbers, stabilizers and/or additives) are employed, they may be added to the raw polypropylene resin previously, to the raw polypropylene resin at the time of melting it or to the graft-copolymerized modified polypropylene resin by an optional method.

Examples of the above-mentioned aromatic vinyl monomer are styrene, alkyl-substituted styrene, halogenated styrene, nitrated styrene, divinylbenzene, isopropenyl styrene and the like. More particularly there are one or more of styrene; methylstyrene such as o-methylstyrene, m-methylstyrene, p-methylstyrene, α-methylstyrene, β-methylstyrene, dimethylstyrene or trimethylstyrene; chlorostyrene such as α-chlorostyrene, β-chlorostyrene, o-chlorostyrene, m-chlorostyrene, p-chlorostyrene, dichlorostyrene or trichlorostyrene; bromostyrene such as o-bromostyrene, m-bromostyrene, p-bromostyrene, dibromostyrene or tribromostyrene; fluorostyrene such as o-fluorostyrene, m-fluorostyrene, p-fluorostyrene, difluorostyrene or trifluorostyrene; nitrostyrene such as o-nitrostyrene, m-nitrostyrene, p-nitrostyrene, dinitrostyrene or trinitrostyrene; vinylphenol such as o-hydroxystyrene, m-hydroxystyrene, p-hydroxystyrene, dihydroxystyrene or trihydroxystyrene; divinylbenzene such as o-divinylbenzene, m-divinylbenzene, or p-divinylbenzene; diisopropenylbenzene such as o-diisopropenylbenzene, m-diisopropenylbenzene or p-diisopropenylbenzene; and the like. Among them, styrene, methylstyrene such as α-methylstyrene or p-methylstyrene; divinylbenzene; or a mixture of divinylbenzene isomers is preferable from a point that it is inexpensive.

The modified polypropylene resin in the present invention is one in which the average number of the grafted aromatic vinyl chains comprising the above-mentioned aromatic vinyl monomer is at least one per one molecule of the modified polypropylene copolymer.

It is preferable that the above-mentioned grafted aromatic vinyl chain comprises one or more of the above-mentioned aromatic vinyl monomers, and may be one formed by copolymerizing the aromatic vinyl monomer with other vinyl monomer copolymerizable therewith.

Examples of the other vinyl monomer copolymerizable with the above-mentioned aromatic vinyl monomer are vinyl chloride; vinylidene chloride; an acrylic ester such as acrylonitrile, methacrylonitrile, acrylamide, methacrylamide, vinyl acetate, acrylic acid, methacrylic acid, maleic acid, maleic anhydride, metal acrylate, metal methacrylate, methyl acrylate, ethyl acrylate, butyl acrylate, 2-ethylhexyl acrylate, stearyl acrylate or glycyl acrylate; a methacrylic ester such as methyl methacrylate, ethyl methacrylate, butyl methacrylate, 2-ethylhexyl methacrylate, stearyl methacrylate or glycyl methacrylate; and the like.

In case where the grafted aromatic vinyl chain contains the aromatic vinyl monomer component and the other vinyl monomer component copolymerizable therewith, it is preferable that the average amount of the other vinyl monomer component is less than 100 parts by weight, further preferably less than 75 parts by weight to 100 parts by weight of the aromatic vinyl monomer component. When the other vinyl monomer component copolymerizable with the aromatic vinyl monomer and contained in the grafted aromatic vinyl chain exceeds the above-mentioned range, there is a case where desirable strands cannot be formed by extruding the modified polypropylene resin, and therefore, suitable pellets cannot be obtained.

The modified polypropylene resin polymer of the present invention may have at least one grafted aromatic vinyl chain in average per one molecule thereof. The modified polypropylene resin having the thus grafted aromatic vinyl chain becomes easy to be elastically deformed greatly at melting. It is preferable that the number (average number) of the grafted aromatic vinyl chains is in the range of 1 to 100. When the average number is less than 1, large elastic deformation at melting tends to be difficult to occur. On the contrary, in order to make the average number being more than 100, usually a large amount of radical polymerization initiator is required and there is a case of not being advantageous from economical point of view.

The average number of the grafted aromatic vinyl chains can be represented by the following equation:

(Number of grafted aromatic vinyl chains)=(Weight average molecular weight of modified polypropylene resin)×(Number of parts by weight of grafted aromatic vinyl chains grafting on one part by weight of modified polypropylene resin)/(Weight average molecular weight of grafted aromatic vinyl chain)

There is a case where the grafted aromatic vinyl chain consists of the aromatic vinyl monomer or comprises the aromatic vinyl monomer and the other vinyl monomer (hereinafter the same).

It is necessary that the weight average molecular weight of the above-mentioned grafted aromatic vinyl chains is not less than 200. In that case, large elastic deformation of the modified polypropylene resin can be obtained at melting. Also it is preferable that the weight average molecular weight of the grafted aromatic vinyl chains is in the range of 300 to 30,000, more preferably in the range of 1,000 to 25,000 in order to increase the number of grafting chains and thus obtain the modified polypropylene resin which is easy to be elastically deformable greatly at melting.

Also the grafted aromatic vinyl chains are formed through graft copolymerization reaction of the raw polypropylene resin and the aromatic vinyl monomer in the presence of a radical polymerization initiator. In that graft copolymerization reaction, there also occurs graft copolymerization reaction between the molecules of the raw polypropylene resin. The degree of such graft copolymerization between the molecules of the raw polypropylene resin polymers can be represented by the branching-parameter (g') of the modified polypropylene resin.

The above-mentioned branching-parameter (g') can be calculated specifically through measurement with high temperature GPC (gel permeation chromatograph) method (column temperature: 140° C.) by using a crystallized modified polypropylene resin from xylene and then analysis of data obtained from chromatogram of an RI detector and data obtained from chromatogram of a viscometer connected directly to the GPC by using Multi-detector GPC Software Ver. 3.00 (available from Nippon Waters Limited). The branching-parameter (g') is one calculated based on the weight average molecular weight.

It is preferable from the viewpoint of the modified polypropylene resin being suitably elastically deformable easily at melting, that the above-mentioned branching-parameter (g') is less than 1, that is to say, the polypropylene polymer molecule or modified polypropylene copolymer molecule, both of which are grafting on the molecule of the modified polypropylene copolymer, is at least present in the modified polypropylene resin. It is further preferable from the viewpoint of the modified polypropylene resin being more suitably elastically deformable easily at melting, that the parameter is less than 0.8, that is to say, a larger number of polypropylene polymer molecules and/or modified polypropylene copolymer molecules, both of which are grafting on the molecule of the modified polypropylene copolymer, is present suitably in the modified polypropylene resin.

Also it is preferable that the above-mentioned modified polypropylene resin has such characteristic that the elongational viscosity thereof measured under molten state drastically increases with increase in an amount of strain.

With respect to the above-mentioned characteristic of increase in the elongational viscosity (hereinafter may be referred to as "specific characteristic of the elongational viscosity"), explanation is made below in detail.

Example of a method of evaluating this characteristic is a method which comprises chucking, with rotary clamps, both ends of a sample of a resin molding in the form of a strand having a diameter of about 3 mm, maintaining the sample temperature at a temperature where the sample is completely melted (for example, usually about 180° C. in the case of the modified polypropylene resin of the present invention), elongating at a given rate of strain, measuring stress generated between the chucked portions with the lapse of time, and calculating the elongational viscosity from a relation of the stress and the cross-sectional area of the sample at the time when the stress is measured.

Namely, the elongational viscosity is represented by the following equation:

$$\eta e = \frac{\sigma}{\dot{\gamma}}$$

wherein $\eta e$ is an elongational viscosity (poise), $\sigma$ is a stress per cross-sectional area (dynes/cm$^2$), $\dot{\gamma}$ is a strain rate (/sec) represented by the following equation:

$$\dot{\gamma} = \frac{1}{L} \cdot \frac{dL}{dt}$$

wherein L is a length of the sample (cm), t is time (second).

The elongational viscosity is plotted with the lapse of time. At that time, it can be said that the specific characteristic of the elongational viscosity means that the elongational viscosity gradually increases with the lapse of time (with increase of strain) and the increasing ratio thereof drastically increases from a certain measuring time (at a certain strain rate).

In a curve showing a relation between the measuring time and the elongational viscosity, in which the abscissa represents a logarithm of the measuring time and the ordinate represents a logarithm of the elongational viscosity, it is so evaluated that the elongational viscosity is drastically increasing with the lapse of time (with increase of strain) when, in the curve, a gradient ratio of a straight line drawn from a slowly increasing portion of the elongational viscosity at an initial stage of measurement to that drawn from a drastically increasing portion with a lapse of time is not less than 2 times (hereinafter may be referred to as "gradient ratio of both straight lines").

It is preferable that the gradient ratio of both straight lines is not less than 5 times. By using the modified polypropylene resin having such a characteristic, a suitable foamed article having a higher expansion ratio and a higher closed cell content can be obtained.

Though an upper limit of the above-mentioned gradient ratio is not restricted, according to the preparation processes of the present invention, the modified polypropylene resin, in which the gradient ratio of both straight lines is up to about 20 times, can be produced.

The reason why the modified polypropylene resin having the specific characteristic of the elongational viscosity is capable of expanding particularly suitably is not clear.

For example, even in case where electron beams are made to act on polypropylene to modify it into a resin having branches of long chains, the obtained modified polypropylene resin has the specific characteristic of the elongational viscosity. Foamability property of the thus modified polypropylene is improved as compared with conventional polypropylene. However, effect of the improvement of the foamability property is not attainable to that of the modified polypropylene resin of the present invention.

The gradients of the respective straight lines drawn from the above-mentioned curve are obtained from the following equation:

Gradient of straight lines=Δ(log ηe)/Δ(log t) wherein ηe is an elongational viscosity (poise), t is a measuring time (second).

FIG. 1 shows an example of a relation of an elongational viscosity of the modified polypropylene resin of the present invention and a measuring time. FIG. 1 shows a relation of the elongational viscosity (logarithm) and the measuring time (logarithm) in case where the modified polypropylene resin of Example 19 mentioned hereinafter is shaped into a cylindrical rod having a diameter of 3 mm and a length of 180 mm and the rod is stretched at a strain rate of 0.154/sec, 0.085/sec, 0.051/sec or 0.024/sec, respectively at 180° C.

In FIG. 1, from the relation of the gradient of the straight line drawn from the flat portion (a portion where the elongational viscosity increases relatively slowly as the measuring time passes) of each curve at an initial stage of measurement and the gradient of the straight line drawn from the portion where the elongational viscosity increases most rapidly as the measuring time passes (each gradient shown in parentheses in FIG. 1), it is seen that the elongational viscosity increases rapidly under all the strain rates with increase of the strain.

The measuring temperature in that case is not limited to 180° C. and may be optionally selected from a temperature range of not less than the temperature where the sample resin melts substantially and less than the temperature where the sample resin starts thermal decomposition. It is usually preferable to set the measuring temperature in the range of 170° to 250° C. Also it is usually preferable to set the strain rate in the range of 0.01 to 0.5/sec.

In case of a resin, in which the specific characteristic of the elongational viscosity is recognized at an optional point in the above-mentioned measuring temperature range and in the above-mentioned range of the strain rate, usually the specific characteristic can be recognized in all the above-mentioned ranges of the measuring temperature and the strain rate.

It is preferable from a point of the modified polypropylene resin being easily elastically deformable greatly at melting, that the molecular weight distribution (Z average molecular weight (Mz)/weight average molecular weight (Mw)) of the modified polypropylene resin is not less than 3, that is, a larger amount of high molecular components is contained. It is further preferable that the molecular weight distribution is not less than 3.5, that is, a larger amount of the high molecular components is contained, from a point that the large and suitable elastic deformation of the modified polypropylene resin occurs easily.

As mentioned above, a melt elasticity of the modified polypropylene resin becomes high by grafting the aromatic vinyl chains on the raw polypropylene resin.

As evaluation for the melt elasticity of the modified polypropylene resin, there are an equilibrium compliance or a recoverable shear strain per unit stress. It can be said that the larger the equilibrium compliance and the recoverable shear strain per unit stress are, the more greatly and easily the resin is elastically deformable. In the case of the process for producing foamed articles by melt-kneading the resin and the foaming agent and then extruding, it is preferable to employ a resin being easily elastically deformable greatly, from a point that cells grow greatly immediately after coming out of dies in the extrusion and expansion steps and thus the cell walls are difficult to break. Also in the case of the process for producing foamed articles by heating a kneaded resin and thermally decomposable foaming agent up to a temperature where the thermally decomposable foaming agent generates vapor, it is preferable to employ a resin being elastically deformable greatly and easily, from a point that the cells can appear and grow immediately after thermal decomposition and generation of vapor and therefore cell walls are difficult to break.

The equilibrium compliance of the above-mentioned modified polypropylene resin is preferably not less than $10 \times 10^{-4}$ m$^2$/N, more preferably not less than $15 \times 10^{-4}$ m$^2$/N because the modified polypropylene resin is easily elastically deformable greatly. Also the recoverable shear strain per unit stress of the modified polypropylene resin at a shear rate of 1 sec$^{-1}$ is preferably not less than $3 \times 10^{-4}$ m$^2$/N, more preferably not less than $5 \times 10^{-4}$ m$^2$/N because the modified polypropylene resin is easily elastically deformable greatly.

The equilibrium compliance of the modified polypropylene resin is obtained particularly by putting the discoidal sample shaped into a thickness of 1.4 mm and a diameter of 25 mm between the parallel plates, applying a shear stress of 10,000 N/m² for 300 seconds at a measuring temperature of 210° C. with a stress control type rheometer (DSR 200 available from Rheometrics Far East Co., Ltd.) and then removing the shear stress. Thus the equilibrium compliance can be obtained as a value of creep recovery.

The recoverable shear strain per unit stress of the modified polypropylene resin can be obtained particularly by putting the discoidal sample formed into a thickness of 1.4 mm and a diameter of 25 mm between a cone and a plate, continuing twisting at a measuring temperature of 210° C. at a constant strain rate, measuring a primary normal stress and a shear stress with a distortion control type rheometer (RDAII available from Rheometrics Far East Co., Ltd.), and substituting the respective measured values at a shear rate of 1 sec$^{-1}$ into the following equation:

(Recoverable shear strain per unit stress )=First normal stress)/ 2(shear stress)²

In the case of the modified polypropylene resin in which the equilibrium compliance and the recoverable shear strain per unit stress are less than the above-mentioned ranges, there is a case where breakage of the cells arises in the expanding step, thereby decreasing the expansion ratio and the closed cell content.

Also the weight average molecular weight of the above-mentioned modified polypropylene resin is preferably from 50,000 to 2,000,000, more preferably from 100,000 to 1,000,000 from a point that the foamed article having suitable form, good appearance and suitable structure can be obtained.

In the modified polypropylene resin of the present invention, by grafting the aromatic vinyl chains on the raw polypropylene resin, a peak temperature of the modified polypropylene resin on the DSC chart drops as compared with a peak temperature of the raw polypropylene resin on the DSC chart (hereinafter simply referred to as "peak temperature on DSC chart") in measurement with DSC.

The peak of the modified polypropylene resin on the DSC chart obtained by means of DSC becomes a single peak when graft polymerization is conducted uniformly. Whether or not the graft polymerization is uniform depends on methods of charging the aromatic vinyl monomer (or aromatic vinyl monomer and other vinyl monomer copolymerizable therewith) and the radical polymerization initiator, kneading conditions at melt-kneading, and the like.

The above-mentioned modified polypropylene resin can be obtained by melt-kneading the raw polypropylene resin and the aromatic vinyl monomer in the presence of the radical polymerization initiator. Also the above-mentioned other resin (a resin other than the raw polypropylene resin) and/or rubber may be mixed in the melt-kneading.

The above-mentioned grafted aromatic vinyl chains may be formed by copolymerizing the aromatic vinyl monomer and other monomer copolymerizable therewith. In that case, the graft copolymerization reaction may be carried out by a method of melt-kneading the aromatic vinyl monomer, other vinyl monomer copolymerizable therewith and the raw polypropylene resin in the presence of the radical polymerization initiator.

Also, if necessary, the above-mentioned stabilizers, additives or the like may be admixed in melt-kneading.

The amount of the aromatic vinyl monomer to be melt-kneaded is preferably from 0.1 to 100 parts by weight, more preferably from 0.1 to 50 parts by weight on the basis of 100 parts by weight of the raw polypropylene resin. If the amount of the vinyl monomer is less than the above-mentioned range, there is a tendency that the average number of the grafted aromatic vinyl chains becomes less than 1 per one molecule of the obtained graft copolymer (modified polypropylene resin) and in such a case, elastic deformation cannot be great enough in melting. On the contrary, if the adding amount exceeds the above-mentioned range, a large amount of radical polymerization initiator tends to be required, which is disadvantageous from the viewpoint of cost.

As the above-mentioned radical polymerization initiator, there are generally employed peroxides or azo compounds. In order to cause graft copolymerization reaction between the polymer molecules of the raw polypropylene resin and the vinyl monomer and between the polymer molecules of the raw polypropylene resin, the presence of a compound having so-called ability of abstracting hydrogen is necessary. As such compounds, there are organic peroxides, for instance, ketone peroxides such as methyl ethyl ketone peroxide and methyl acetoacetate peroxide; peroxyketals such as 1,1-bis(t-butylperoxy)-3,3,5-trimethylcyclohexane, 1,1-bis(t-butylperoxy)cyclohexane, n-butyl-4,4-bis (tbutylperoxy)valerate and 2,2-bis(t-butylperoxy)butane; hydroperoxides such as permethane hydroperoxide, 1,1,3,3-tetramethylbutyl hydroperoxide, di-isopropylbenzene hydroperoxide and cumene hydroperoxide; dialkyl peroxides such as dicumyl peroxide, 2,5-dimethyl-2,5-di (tbutylperoxy)hexane, α,α'-bis(t-butylperoxy-m-isopropyl) benzene, t-butylcumyl peroxide, di-t-butyl peroxide and 2,5-dimethyl-2,5-di(t-butylperoxy)hexyne-3; diacyl peroxides such as benzoyl peroxide; peroxydicarbonates such as di(3-methyl-3-methoxybutyl) peroxydicarbonate and di-2-methoxybutyl peroxydicarbonate; peroxyesters such as t-butyl peroxyoctate, t-butyl peroxyisobutylate, t-butyl peroxylaurate, t-butyl peroxy-3,5,5-trimethyl-hexanoate, t-butyl peroxyisopropylcarbonate, 2-5-dimethyl-2,5-di (benzoylperoxy)hexane, t-butyl peroxyacetate, t-butyl peroxybenzoate and di-t-butyl peroxyisophthalate; and the like. Among them, particularly those having a high ability of abstracting hydrogen are preferable. Examples thereof are one or more of, for example, peroxyketals such as 1,1-bis (t-butylperoxy)-3, 3,5-trimethylcyclohexane, 1,1-bis(t-butylperoxy)cyclohexane, n-butyl-4,4-bis(t-butylperoxy) valerate and 2,2-bis(t-butylperoxy)butane; dialkyl peroxides such as dicumyl peroxide, 2,5-dimethyl-2,5-di(t-butylperoxy)hexane, α, α'-bis(t-butylperoxy-m-isopropyl) benzene, t-butylcumyl peroxide, di-t-butyl peroxide and 2,5-dimethyl-2,5-di(t-butylperoxy)hexyne-3; diacyl peroxides such as benzoyl peroxide; peroxyesters such as t-butyl peroxyoctate, t-butyl peroxyisobutylate, t-butyl peroxylaurate, t-butyl peroxy-3,5,5-trimethyl-hexanoate, t-butyl peroxyisopropylcarbonate, 2-5-dimethyl-2,5-di (benzoylperoxy)hexane, t-butyl peroxyacetate, t-butyl peroxybenzoate and di-t-butyl peroxyisophthalate; and the like.

The amount of the above-mentioned radical polymerization initiator is preferably in the range of 0.1 to 10 parts by weight, more preferably 0.5 to 5 parts by weight on the basis of 100 parts by weight of the raw polypropylene resin from a point of making the modified polypropylene resin being easily elastically deformable greatly and from economical point of view.

Though there were methods of modifying polypropylene resin by using radical polymerization initiator, as compared with such conventional methods, in case where the modified polypropylene resin is produced using a large amount of radical polymerization initiator in the present invention, the average number of aromatic vinyl chains grafted on one molecule of the modified polypropylene resin polymer can be larger than that of the modified polypropylene resin polymer produced by the conventional methods.

The amount of the other monomer which may be melt-kneaded together with the above-mentioned aromatic vinyl monomer is preferably less than 100 parts by weight, more preferably less than 75 parts by weight on the basis of 100 parts by weight of the aromatic vinyl monomer. If the amount of the other vinyl monomer exceeds the above-mentioned range, there is a case where foamed articles having suitable shape, appearance and structure cannot be obtained.

As mentioned above, the amount of the resin or rubber which may be melt-kneaded together with the raw polypropylene resin may be in the range not impairing the effect of the present invention. It is preferable that the amount is usually not more than 25% by weight.

Also the above-mentioned stabilizers and additives may be added, if necessary, in proper amounts at melt-kneading.

Examples of suitable combination of the raw polypropylene resin and the aromatic vinyl monomer are, as the raw polypropylene resin, one or more of polypropylene homopolymer, a propylene/ethylene random copolymer, a propylene/butene random copolymer, a propylene/ethylene block copolymer or a propylene/butene block copolymer and, as the aromatic vinyl monomer, one or more of styrene, α-methylstyrene, p-methylstyrene or divinylbenzene. To the above-mentioned combination may be added rubbers or other resins. Examples thereof are one or more of an ethylene/propylene copolymer, an ethylene/propylene/diene copolymer, polybutadiene, polyisoprene, a styrene/butadiene random copolymer, a styrene/butadiene/styrene block copolymer, polyethylene, ethylene/vinyl acetate, ethylene/(meth)acrylic acid metal salt or polystyrene. The modified polypropylene resin having the combination as mentioned above is elastically deformable greatly at melt-kneading and has characteristic of being excellent particularly in foamability property.

As the example of particularly suitable combination of the raw polypropylene resin, aromatic vinyl monomer and radical polymerization initiator, there are, as the raw polypropylene resin, one or more of polypropylene homopolymer, a propylene/ethylene random copolymer or a propylene/ethylene block copolymer; as the aromatic vinyl monomer, styrene; and as the radical polymerization initiator, one or more of α, α'-bis-(tbutylperoxy-m-isopropyl)benzene, 2,5-dimethyl-2,5-di(tbutylperoxy)hexyne-3 or di-t-butyl peroxide.

The order and method of mixing and melt-kneading those raw polypropylene resin, aromatic vinyl monomer, radical polymerization initiator and other materials are not specifically limited. For example, the raw polypropylene resin, aromatic vinyl monomer, radical polymerization initiator and if necessary, other adding materials may be melt-kneaded after mixed, or after the raw polypropylene resin is melt-kneaded, the aromatic vinyl monomer, radical polymerization initiator and if necessary, other adding materials may be mixed to the melt-kneaded resin simultaneously or separately, or batchwise or dividedly.

Though a heating temperature at melt-kneading varies depending on kind of the resin, it is preferable that the heating temperature is usually from 130° to 400° C. from a point that the raw polypropylene resin is melted sufficiently and is not thermally decomposed and that the sufficient reaction of the graft copolymerization occurs. Also the melt-kneading time (a melt-kneading time after the radical polymerization initiator and aromatic vinyl monomer have been mixed) is usually from 1 to 60 minutes.

As kneaders used for the above-mentioned melt-kneading, there are equipments capable of heating high molecular materials to a proper temperature and kneading with a shear stress being applied, for example, a kneader such as roll, co-kneader, Banbury mixer, Brabender, single screw extruder or twin screw extruder, a horizontal type stirrer such as twin-screw surface modifying equipment or twin-screw multi-disc equipment and a vertical type stirrer such as double helical ribbon blender. Among them, the single screw extruder and twin screw extruder are preferable from productivity point of view. Also in order to mix each material homogeneously, the melt-kneading may be repeated plural times.

Thus, the modified polypropylene resin of the present invention can be produced.

As an example of a method of producing the foamed articles of the present invention, there is a method of melt-extruding the modified polypropylene resin and the foaming agent.

The above-mentioned melt-extruding can be conducted by kneading the modified polypropylene resin and foaming agent in the extruder and then extruding. Also examples of the method of kneading the modified polypropylene resin and the foaming agent are a method of melt-kneading the modified polypropylene resin and the foaming agent in a melt-extruder, a method of adding the foaming agent to the modified polypropylene resin in the molten state and then kneading the mixture, and the like.

In case where the modified polypropylene resin and the foaming agent are melt-kneaded in the melt-extruder, as the foaming agent, there are a thermally decomposable foaming agent and the like. Examples of the preferable thermally decomposable foaming agent are one or more of, for example, a nitroso foaming agent such as N,N'-dinitrosopentamethylene tetramine or N,N'-dimethyl-N,N'-dinitrosoterephthalamide; an azo foaming agent such as azodicarbonamide or barium azodicarboxylate; a sulfohydrazide foaming agent such as p,p'-oxybisbenzene sulfonyl hydrazide or p-toluene sulfonyl semicarbazide; trihydrazinotriazine; and the like.

The adding amount (kneading amount) of the above-mentioned foaming agent varies depending on kind of the foaming agent and the desired expansion ratio, and is preferably in the range of 1 to 100 parts by weight usually on the basis of 100 parts by weight of the modified polypropylene resin.

Also in order to properly control the cell diameter of the foamed article, a nucleating agent for the expansion such as sodium dicarbonate-citric acid, talc or the like may be used. The amount of the nucleating agent added if necessary is usually in the range of 0.01 to 1 part by weight on the basis of 100 parts by weight of the modified polypropylene resin.

In that method, the foamed article can be formed by supplying the modified polypropylene resin and the thermally decomposable foaming agent together into the melt-kneader, melt-kneading at a proper temperature to decompose the foaming agent and generate vapor, and discharging the modified polypropylene resin being in the molten state and containing vapor out of the dies.

In that method, the melt-kneading temperature and time may be properly selected depending on kind of the foaming agent used, kind of the melt-kneader and other kneading conditions. The melt-kneading temperature and time, though varying depending on kind of the resin, are usually from 130° to 400° C. and from 1 to 60 minutes, respectively.

In the method of adding the foaming agent to the modified polypropylene resin in the molten state and then kneading, as the foaming agent, there are volatile foaming agents, for instance, aliphatic hydrocarbons; alicyclic hydrocarbons; halogenated hydrocarbons such as chlorinated hydrocarbons, fluorinated chlorinated hydrocarbons and fluorinated hydrocarbons; aliphatic alcohols; ethers; esters; inorganic gases; water and the like. Among them, examples of the preferable volatile foaming agents are, for instance, one or more of an aliphatic hydrocarbon such as propane, butane, isobutane, pentane, hexane or heptane; an alicyclic hydrocarbon such as cyclobutane, cyclopentane or cycohexane; a halogenated hydrocarbon such as chlorodifluoromethane, dichloromethane, dichlorofluoromethane, dichlorodifluoromethane, trichlorofluoromethane, chloroethane, dichlorotrifluoroethane, dichlorotetrafluoroethane, trichlorotrifluoroethane, tetrachlorodifluoroethane or perfluorocyclobutane; an inorganic gas such as carbon dioxide, nitrogen, oxygen or argon; water and the like.

The adding amount (kneading amount) of the above-mentioned foaming agent varies depending on kind of the foaming agent and the desired expansion ratio. It is usually in the range of 1 to 100 parts by weight on the basis of 100 parts by weight of the modified polypropylene resin, and preferably in the range of 1 to 50 parts by weight from the viewpoint of cost.

Also in that method, in order to control the cell size of the foamed article properly, a nucleating agent for the expansion such as sodium dicarbonate-citric acid, talc or the like may be used if necessary. The amount of the nucleating agent is usually in the range of 0.01 to 1 part by weight on the basis of 100 parts by weight of the modified polypropylene resin.

Also in the case of that method, the foamed article can be formed by melting the modified polypropylene resin in an extruder, feeding the pressurized volatile foaming agent in the extruder, kneading the molten modified polypropylene resin and the volatile foaming agent with maintaining the inside pressure of the kneader high, and discharging the sufficiently kneaded composition of the modified polypropylene resin and volatile foaming agent out of the extruder.

In that method, the melt-kneading temperature and time may be properly selected depending on kind of the foaming agent, kind of the melt-kneader and other kneading conditions. The melt-kneading temperature and time, though changing depending on kind of the resin, are usually from 130° to 300° C. and from 1 to 120 minutes, respectively.

As the another example of a method of producing the foamed article of the present invention, there is a method of production by melt-kneading the modified polypropylene resin and the thermally decomposable foaming agent generating vapor by thermal decomposition, at a temperature where the foaming agent does not generate vapor, forming the melt-kneaded composition of the modified polypropylene resin and thermally decomposable foaming agent into a sheet and heating the sheet of melt kneaded composition up to a temperature where the foaming agent generates vapor.

In that method, as the foaming agent, there are thermally decomposable foaming agents or the like. Among them, examples of the thermally decomposable foaming agent are, for instance, one or more of a nitro foaming agent such as N,N'-dinitrosopentamethylenetetramine or N,N'-dimethyl-N,N'-dinitroterephthalamide; an azo foaming agent such as azodicarbonamide or barium azodicarboxylate; a sulfohydrazide foaming agent such as p,p'-oxybisbenzene sulfonyl hydrazide or p-toluene sulfonyl semicarbazide; trihydrazinotriazine and the like.

The adding amount (kneading amount) of the above-mentioned foaming agent varies depending on kind of the foaming agent and the desired expansion ratio, and it is preferable that the adding amount is usually from 1 to 100 parts by weight on the basis of 100 parts by weight of the modified polypropylene resin.

Also in that method, in order to control the cell size of the foamed article properly, a nucleating agent for the expansion such as sodium dicarbonate-citric acid, talc or the like may be used if necessary. The amount of the nucleating agent is usually in the range of 0.01 to 1 part by weight on the basis of 100 parts by weight of the modified polypropylene resin.

Also in that method, as an equipment for melt-kneading the thermally decomposable foaming agent and the modified polypropylene resin, there are a kneader such as roll, co-kneader, Banbury mixer, Brabender, single screw extruder or twin screw extruder, a horizontal type stirrer such as twin-screw surface modifying equipment or twin-screw multi-disc equipment and a vertical type stirrer such as double helical ribbon blender. Among them, the roll, single screw extruder and twin screw extruder are preferable from productivity point of view.

In that method, the melt-kneading temperature and time may be properly selected depending on kind of the foaming agent used, kind of the melt-kneader and other kneading conditions. The melt-kneading temperature and time, though varying depending on kind of the resin, are usually from 130° to 300° C. and from 1 to 60 minutes, respectively.

Also in that method, in case where the modified polypropylene resin and the thermally decomposable foaming agent are kneaded and extruded by using an extruder with dies (for example, T dies) having the roll or slit form dies, the obtained extrudate is in the form of a sheet.

If the extrudate obtained from the melt-kneaded modified polypropylene resin and thermally decomposable foaming agent cannot be in the form of a sheet, it can be formed into the sheet by a method of heating and pressing at a temperature where the foaming agent is not substantially decomposed, or the like method. The heating temperature and time for expanding the sheet may be properly selected depending on kind of the foaming agent, and are usually from 150° to 400° C. and from 0.1 to 10 minutes, respectively.

In producing the thick foamed article, it has been very difficult to obtain the article having a high expansion ratio, a high closed cell content, excellent surface properties and excellent dimensional stability. However, thick foamed articles having those excellent characteristics can be obtained by using the modified polypropylene resin of the present invention.

Also in the case of the above-mentioned modified polypropylene resin having the specific elongational viscosity characteristic, effects of the present invention can be fully exhibited even if a thick foamed article having a thickness of about 5 to about 100 mm is formed.

It can be said that foamed articles having an apparent density of 0.01 to 0.3 $g/cm^3$, particularly 0.015 to 0.2 $g/cm^3$ are excellent in characteristic of being light in weight, heat-insulating property, energy absorption property against external stress, compression strength and the like.

Also it is preferable that the expansion ratio of the above-mentioned foamed article is from 3 to 90 times, more preferably from 4.5 to 60 times from the same viewpoints as in the apparent density.

The foamed article of the present invention is high in quality, easily produceable and low in production cost, and therefore, is very useful as a foamed polypropylene article and can be used widely, for example, as packaging materials, cushion materials, insulating materials and the like.

The foamed article of the present invention has the closed cell content of preferably not less than 50%, more preferably not less than 70%, particularly preferably not less than 80% in order to obtain suitable heat resistance, good energy absorption property against external stress and excellent compression strength.

According to the modified polypropylene resin of the present invention, foamed article having the apparent density, expansion ratio and closed cell content as mentioned above can be easily obtained.

The features of the resin portion of the foamed article of the present invention are nearly the same as those of the modified polypropylene resin used for producing the foamed article.

Namely, the resin portion of the foamed article of the present invention is a graft copolymer of a raw polypropylene resin and an aromatic vinyl monomer. The average number of aromatic vinyl chains grafting on one molecule of the graft copolymer is not less than 1, preferably from 2 to 100, and the weight average molecular weight of the grafted aromatic vinyl chains is not less than 200, preferably from 300 to 30,000. Also the branching-parameter (g') of the resin portion is preferably less than 1, more preferably less than 0.8. It is preferable that the resin portion has the above-mentioned specific characteristic of the elongational viscosity, and that the above-mentioned aromatic vinyl monomer is styrene, methylstyrene or divinylbenzene. Also it is preferable that the molecular weight distribution (Z average molecular weight/weight average molecular weight) of the resin portion is not less than 3, more particularly not less than 3.5, and that the equilibrium compliance of the resin portion is not less than $10\times10^{-4}$ m$^2$/N, more preferably not less than $15\times10^{-4}$ m$^2$/N. It is also preferable that the recoverable shear strain of the resin portion per unit stress at a shear rate of 1 sec$^{-1}$ is not less than $3\times10^{-4}$ m$^2$/N, more preferably not less than $5\times10^{-4}$ m$^2$/N. The resin portion may comprise a polypropylene resin, aromatic vinyl monomer and other vinyl monomer copolymerizable with the aromatic vinyl monomer.

Also by using the modified polypropylene resin in the present invention, in addition to sheet- and board-like foamed articles, those in various forms such as hollow tube and bag, cylinder, elliptical cylinder, square column, strand, pipe, block and the like can be produced. Among them, sheet- and board-like foamed article can be used particularly for wide applications.

The foamed articles of the present invention can be suitably used as sheet-like foamed articles capable of secondary processing and usable for vacuum molding because of a high closed cell content and a small drawdown at secondary processing, and also as relatively thick board-like foamed articles used as energy absorption materials against external stress and core materials because the closed cell content can be made high and a density can be reduced.

The present invention is explained below based on examples, but is not limited thereto.

In the following Examples and Comparative Examples, each characteristic was evaluated by the methods mentioned below.

<Peak temperature on DSC chart of polypropylene resin (raw polypropylene resin)>

A sample of 10 mg was heated to 200° C. at a rate of 50° C./min in nitrogen atmosphere, maintained at that temperature for 5 minutes, cooled down to 50° C. at a rate of 10° C./min, maintained at that temperature for 5 minutes and then heated at a rate of 10° C. /min to measure with a differential scanning calorimetry (DSC) apparatus (DSC-7 available from Perkin Elmer Japan Co., Ltd.). A temperature of a main peak of heat absorption peaks detected when measured under the above-mentioned conditions is assumed to be a peak temperature on the DSC chart.

<Peak temperature on DSC chart of modified polypropylene resin>

Measurement is made in the same manner as in the measurement of the peak temperature on the DSC chart of the polypropylene resin.

Figure 2:
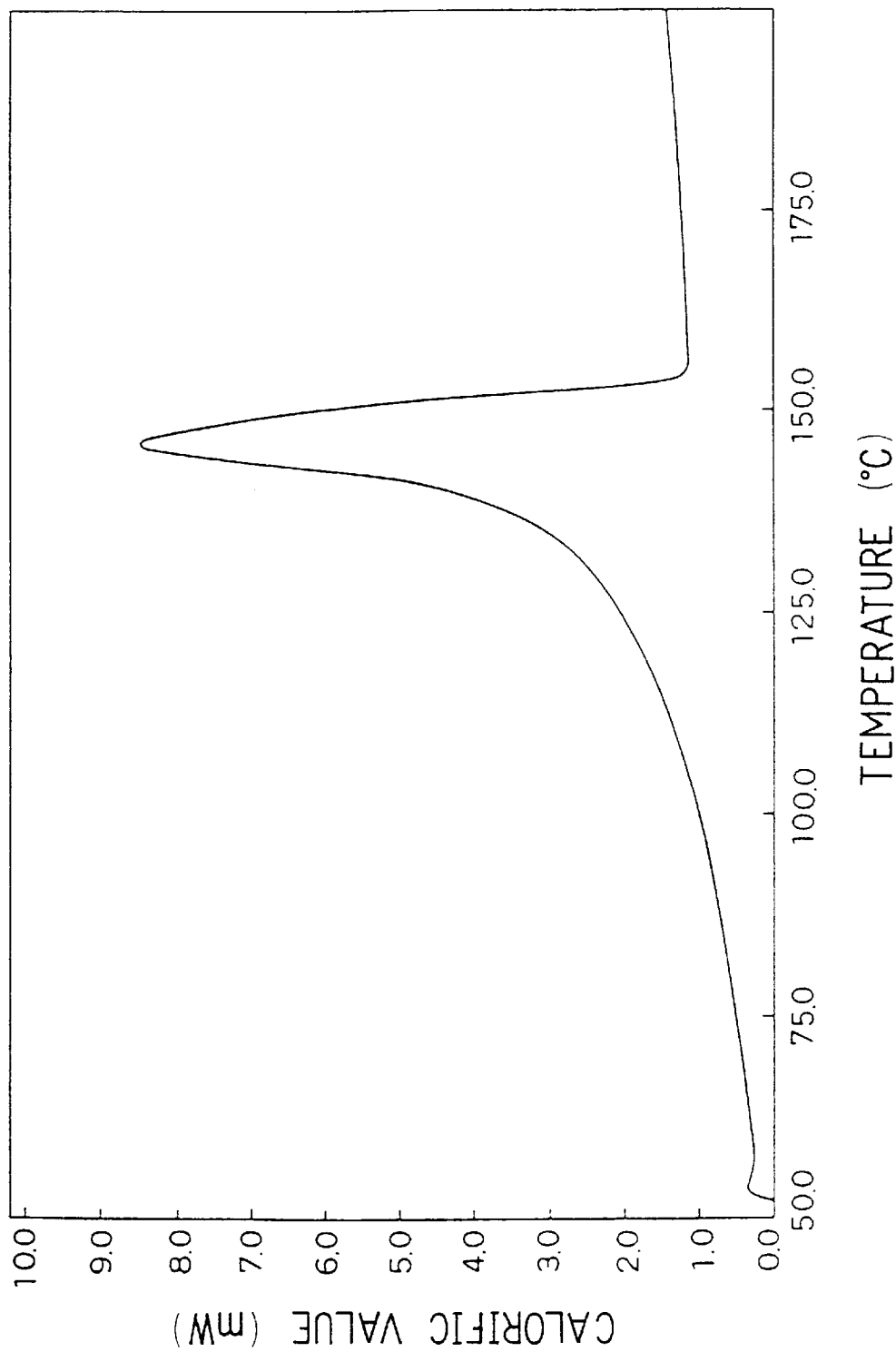
FIG. 2 is a DSC chart of the modified polypropylene resin of Example 1.

FIG. 2 shows a DSC chart of a modified polypropylene resin of Example 1 through measurement by means of the differential scanning calorimeter. In FIG. 2, the abscissa represents a temperature and the ordinate represents a calorific value.

<Average number of grafted aromatic vinyl chains grafting on one molecule of modified polypropylene resin>

The average number of the grafted aromatic vinyl chains is obtained by the following equation:

(Average number of grafted aromatic vinyl chains)=(Weight average molecular weight of modified polypropylene resin)×(Parts by weight of grafted aromatic vinyl chains grafting on one part by weight of modified polypropylene resin)/(Weight average molecular weight of grafted aromatic vinyl chains)

In the above equation, the weight average molecular weight of the modified polypropylene resin is obtained by measuring insoluble portion of modified polypropylene resin in xylene with a high temperature gel permeation chromatography (GPC) (Refraction Index (RI) detector) (150CV GPC system available from Nippon Waters Kabushiki Kaisha) based on standard polystyrene. Also parts by weight of the grafted aromatic vinyl chains grafting on one part by weight of the modified polypropylene resin is obtained through measurement of insoluble portion of the modified polypropylene resin in xylene with an infrared spectrophotometer (IR) (FTIR 8100 system available from Shimadzu Corporation) by using a ratio of a peak height at around 1,370 cm$^{-1}$ derived from polypropylene to a peak height derived from vinyl monomer (for example, in case of styrene, a peak height at around 700 cm$^{-1}$ derived from a benzene ring). The weight average molecular weight of the grafted aromatic vinyl chains is obtained by dissolving, at 140° C., the modified polypropylene resin in xylene having an amount (weight ratio) 20 times larger than that of the modified polypropylene resin, cooling down to normal temperature and suction-filtrating to separate the soluble portion of modified polypropylene and crystallized portion of modified polypropylene (insoluble portion of modified polypropylene), followed by measurement with respect to the soluble portion of modified polypropylene by using a normal temperature gel permeation chromatography (GPC) (510GPC system available from Nippon Waters Kabushiki Kaisha).

<Branching-parameter (g')>

The branching-parameter (g') can be calculated specifically through measurement with high temperature GPC (gel permeation chromatograph) method (column temperature: 140° C.) by using the above-mentioned crystallized modified polypropylene resin from xylene and then analysis of data obtained from chromatogram of an RI detector and data obtained from chromatogram of a viscometer connected directly to the GPC by using Multi-detector GPC Software Ver. 3.00 (available from Nippon Waters Limited). The branching-parameter (g') is one calculated at the weight average molecular weight.

The branching-parameter (g') is an evaluation for measurement of branches of molecular chains of a polypropylene polymer in the above-mentioned modified polypropylene resin polymer.

<Relation between elongational viscosity and amount of strain under molten condition>

Pellets of the above-mentioned modified polypropylene resin are charged in a capilograph provided with an orifice having a diameter of 3 mm, melted at 200° C. and extruded to give a strand-form sample having about 180 mm length. Then a relation between the elongational viscosity and the measuring time is evaluated at 180° C. at a strain rate of 0.05/sec with the obtained sample by using a Melten rheometer available from Toyo Seiki Kabushiki Kaisha. In that case, the elongational viscosity is obtained by dividing the stress by a cross-sectional area of the sample which is measured with a charge coupled device (CCD). Namely, the elongational viscosity is represented by the following equation:

$$\eta e = \frac{\sigma}{\dot{\gamma}}$$

wherein $\eta e$ is an elongational viscosity (poise), $\sigma$ is a stress per cross-sectional area (dynes/cm$^2$), $\dot{\gamma}$ is a strain rate (/sec) represented by the following equation:

$$\dot{\gamma} = \frac{1}{L} \cdot \frac{dL}{dt}$$

wherein L is a length of the sample (cm), t is time (second).

Figure 3:
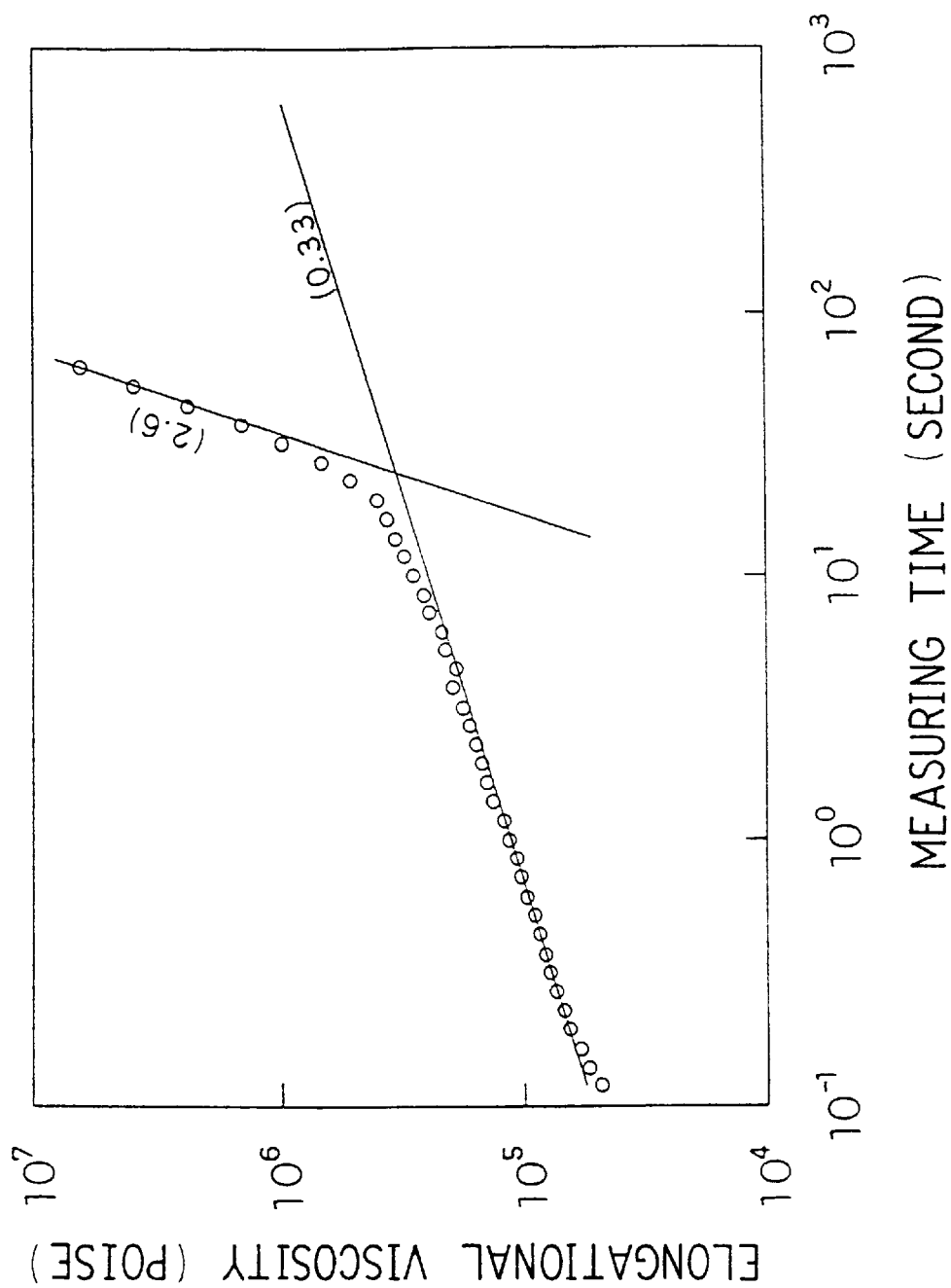
FIG. 3 is a graph showing a relation of an elongational viscosity of the modified polypropylene resin of Example 19 in the molten state and a measuring time (strain rate).

The relation between the elongational viscosity of the modified polypropylene resin and the measuring time in Example 19 is shown in FIG. 3. In FIG. 3, the elongational viscosity is increasing slowly up to 10 seconds after starting of measurement, but thereafter increasing rapidly. A ratio of the slowly increasing flat gradient at an initial stage of the measurement (a gradient of a straight line drawn from the relatively slowly increasing portion of the elongational viscosity with a lapse of time) to the rapidly increasing gradient (a gradient of a straight line drawn from the rapidly increasing portion of the elongational viscosity with a lapse of time) is calculated (hereinafter may be referred to as "specific elongational viscosity ratio). The specific elongational viscosity ratio of the modified polypropylene resin of Example 19 was 7.5.

<Apparent density of foamed article>

The apparent density is calculated with a weight of the foamed article and a volume obtained by immersing the article in water.

<Expansion ratio of foamed article>

The expansion ratio is calculated by the following equation:

Expansion ratio (times)=0.91/density of foamed article, wherein 0.91 used in this equation is the rough density of the modified polypropylene resin.

<Closed cell content of foamed article>

The closed cell content is measured with a multi-pycnometer (product of Yuasa Ionics Kabushiki Kaisha) in accordance with ASTM D-2856

<Thickness of foamed article>

The thickness is measured with calipers.

<External appearance of foamed article>

The external appearance is evaluated with naked eyes in accordance with the following criteria.

○: There is seen no un-foamed portion, fuzzing and wrinkling.

x: Un-foamed portion, fuzzing and wrinkling are found.

<Diameter of cell of foamed article>

The foamed article is cut with a cutter, and a cross-section thereof is observed with a scanning electron microscope (SEM) to measure diameters of 100 cells and calculate an average value thereof.

EXAMPLES 1 TO 21

The raw polypropylene resin, vinyl monomer and radical polymerization initiator, which are shown in Table 1, were supplied to a twin screw extruder (LABOTEX) available from Kabushiki Kaisha Nippon Seikosho in the amounts shown in Table 1 in such a state that the raw polypropylene resin previously impregnated with the vinyl monomer was blended with the radical polymerization initiator.

FIG. 2 shows a peak temperature on the DSC chart of the polypropylene resin (raw polypropylene resin) before supplied to the twin screw extruder.

The twin screw extruder had two screws rotating in the same direction. The inner diameter of the cylinder was 32 mm φ and the maximum effective length (L/D) of the screw was 25.5. In the twin screw extruder, the heating was conducted with the cylinder temperature and the feed portion temperature being set at 200° C. and 160° C., respectively. The rotation speed of each screw was set at 100 rpm.

The melt-extruding was conducted under the above-mentioned conditions to give a modified polypropylene resin molding in the form of a rod having a diameter of 4 mm. The obtained modified polypropylene resin molding in the form of a rod was cut to a thickness of 3 mm to give pellets thereof.

With respect to the obtained modified polypropylene resin, a peak temperature on the DSC chart, weight average molecular weight, parts by weight of the aromatic vinyl chains grafting on one part by weight of the modified polypropylene resin, weight average molecular weight of the grafted aromatic vinyl chains, average number of the grafted aromatic vinyl chains, branching-parameter (g') and specific elongational viscosity ratio were evaluated. The results are shown in Table 2.

Then a foamed article was prepared in the following manner by using the obtained pellets of the modified polypropylene resin.

An amount of 100 parts by weight of pelletized modified polypropylene resin, 0.05 part by weight of a blend oil (SUPEREASE available from Koshitani Kagaku Kogyo Kabushiki Kaisha) and 0.1 part by weight of a nucleating agent for the expansion, i. e. sodium bicarbonate-citric acid (CELBONE SG/IC available from Eiwa Kasei Kabushiki Kaisha) were mixed by kneading for 15 minutes in a ribbon blender. The mixture was fed to a tandem type extruder (diameters of the cylinders of the first stage extruder and the second stage extruder were 40 mm φ and 50 mm φ, respectively). In the first stage extruder, the mixture was melted at 230° C., and then 12 parts by weight of a foaming agent, i.e. a butane gas (iso-rich butane gas; weight ratio of normal butane/isobutane was 15:85) (in Examples 19 to 21, an isobutane gas (100% isobutane) was employed instead of the butane gas) was pressure-fed on the basis of 100 parts by weight of the modified polypropylene resin to be kneaded, and then in the second stage extruder, the kneaded mixture was cooled so that the resin temperature would be 150° C. (155° C. in Examples 19 to 21) and extruded through rectangular dies having a slit width of 60 mm and a slit thickness of 0.6 mm, followed by passing through forming dies connected directly to the rectangular dies to give a board-like foamed article.

The apparent density, expansion ratio, closed cell content, thickness and external appearance of the obtained board-like foamed article were evaluated. In addition to these evaluations, a diameter of cells was evaluated in Examples 19 to 21. The results are shown in Tables 3 and 4.

TABLE 1-(1)

| | Ex. 1 | Ex. 2 | Ex. 3 | Ex. 4 | Ex. 5 |
|---|---|---|---|---|---|
| Raw polypropylene resin (part by weight) | Propylene homopolymer *1 (100) | Propylene homopolymer *1 (100) | Propylene homopolymer *1 (100) | Propylene homopolymer *1 (100) | Ethylene/propylene block copolymer *5 (100) |
| Vinyl monomer (part by weight) | Styrene *2 (20) | Styrene *2 (10) | Styrene *2 (20) | Styrene *2 (20) | Styrene *2 (20) |
| Radical polymerization initiator (part by weight) | α,α'-bis(t-butylperoxy-m-isopropyl)benzene *3 (3.5) | α,α'-bis(t-butylperoxy-m-isopropyl)benzene *3 (3.5) | α,α'-bis(t-butylperoxy-m-isopropyl)benzene *3 (1) | 2,5-dimethyl-2,5-di(t-butylperoxy)hexyne-3 *4 (3.5) | α,α'-bis(t-butylperoxy-m-isopropyl)benzene *3 (3.5) |

*1 Product of Sumitomo Kagaku Kogyo Kabushiki Kaisha, NOBLEN D501, Melt flow index at 230° C.: 0.4 g/10 min
*2 Product of Wako Junyaku Kogyo Kabushiki Kaisha, (special grade)
*3 Product of Nippon Yushi Kabushiki Kaisha, PERBUTYL P, 1 minute half-life temperature 175° C.
*4 Product of Nippon Yushi Kabushiki Kaisha, PERHEXYNE 25B, 1 minute half-life temperature 194° C.
*5 Product of Mitsui Sekiyu Kagaku Kogyo Kabushiki Kaisha, HIPOL B240

TABLE 1-(2)

| | Ex. 6 | Ex. 7 | Ex. 8 | Ex. 9 | Ex. 10 |
|---|---|---|---|---|---|
| Raw polypropylene resin (part by weight) | Ethylene/propylene random copolymer *4 (100) | Butene-1/propylene random copolymer *5 (100) | Propylene homopolymer *1 (100) | Propylene homopolymer *1 (100) | Propylene homopolymer *1 (100) |
| Vinyl monomer (part by weight) | Styrene *2 (20) | Styrene *2 (20) | Styrene *2 (10) α-methylstyrene *6 (10) | Styrene *2 (20) Divinylbenzene *7 (1) | Styrene *2 (40) |
| Radical polymerization initiator (part by weight) | α,α'-bis(t-butylperoxy-m-isopropyl)benzene *3 (3.5) | α,α'-bis(t-butylperoxy-m-isopropyl)benzene *3 (3.5) | α,α'-bis(t-butylperoxy-m-isopropyl)benzene *3 (3.5) | α,α'-bis(t-butylperoxy-m-isopropyl)benzene *3 (3.5) | α,α'-bis(t-butylperoxy-m-isopropyl)benzene *3 (3.5) |

*1 Product of Sumitomo Kagaku Kogyo Kabushiki Kaisha, NOBLEN D501, Melt flow index at 230° C.: 0.4 g/10 min
*2 Product of Wako Junyaku Kogyo Kabushiki Kaisha, (special grade)
*3 Product of Nippon Yushi Kabushiki Kaisha, PERBUTYL P, 1 minute half-life temperature 175° C.
*4 Product of Sumitomo Kagaku Kogyo Kabushiki Kaisha, Ethylene content 4% by weight
*5 Product of Sumitomo Kagaku Kogyo Kabushiki Kaisha, Butene-1 content 2.5% by weight
*6 Product of Wako Junyaku Kogyo Kabushiki Kaisha, (special grade)
*7 Product of Wako Junyaku Kogyo Kabushiki Kaisha, (55% isomer mixture)

TABLE 1-(3)

| | Ex. 11 | Ex. 12 | Ex. 13 | Ex. 14 | Ex. 15 |
|---|---|---|---|---|---|
| Raw polypropylene resin (part by weight) | Propylene homopolymer *1 (100) | Propylene homopolymer *1 (100) | Propylene homopolymer *1 (100) | Propylene homopolymer *1 (100) | Propylene homopolymer *1 (100) |
| Vinyl monomer (part by weight) | Styrene *2 (5) | Styrene *2 (10) Methyl methacrylate *4 (10) | Styrene *2 (20) | Styrene *2 (20) | Styrene *2 (20) |
| Radical polymerization initiator (part by weight) | α,α'-bis(t-butylperoxy-m-isopropyl)benzene *3 (3.5) | α,α'-bis(t-butylperoxy-m-isopropyl)benzene *3 (3.5) | P-menthane hydroperoxide *5 (3.5) | n-butyl-4,4-bis(t-butylperoxy)valerate *6 (3.5) | 1,1-bis(t-butylperoxy-3,3,5-trimethylcyclohexane *7 (3.5) |

*1 Product of Sumitomo Kagaku Kogyo Kabushiki Kaisha, NOBLEN D501, Melt flow index at 230° C.: 0.4 g/10 min
*2 Product of Wako Junyaku Kogyo Kabushiki Kaisha, (special grade)
*3 Product of Nippon Yushi Kabushiki Kaisha, PERBUTYL P, 1 minute half-life temperature 175° C.
*4 Product of Wako Junyaku Kogyo Kabushiki Kaisha, (special grade)
*5 Product of Nippon Yushi Kabushiki Kaisha, PERMENTHANE H, 1 minute half-life temperature 200° C.
*6 Product of Nippon Yushi Kabushiki Kaisha, PERHEXA V, 1 minute half-life tmperature 173° C.
*7 Product of Nippon Yushi Kabushiki Kaisha, PERHEXA 3M, 1 minute half-life temperature 149° C.

TABLE 1-(4)

|  | Ex. 16 | Ex. 17 | Ex. 18 |
|---|---|---|---|
| Raw polypropylene resin (part by weight) | Propylene homopolymer *1 (100) | Propylene homopolymer *1 (100) | Propylene homopolymer *1 (100) |
| Vinyl monomer (part by weight) | Styrene *2 (20) | Styrene *2 (20) | Styrene *2 (20) |
| Radical polymerization initiator (part by weight) | 2,5-dimethyl-2,5-di-(t-butylperoxy)hexane *3 (3.5) | t-butyl peroxybenzoate *4 (3.5) | di-t-butyl peroxide *5 (3.5) |

*1 Product of Sumitomo Kagaku Kogyo Kabushiki Kaisha, NOBLEN D501, Melt flow index at 230° C.: 0.4 g/10 min
*2 Product of Wako Junyaku Kogyo Kabushiki Kaisha, (special grade)
*3 Product of Nippon Yushi Kabushiki Kaisha, PERHEXA 25B, 1 minute half-life temperature 180° C.
*4 Product of Nippon Yushi Kabushiki Kaisha, PERBUTYL Z, 1 minute half-life temperature 167° C.
*5 Product of Nippon Yushi Kabushiki Kaisha, PERBUTYL D, 1 minute half-life temperature 175° C.

TABLE 1-(5)

|  | Ex. 19 | Ex. 20 | Ex. 21 |
|---|---|---|---|
| Raw polypropylene resin (part by weight) | Propylene homopolymer *1 (100) | Propylene homopolymer *1 (100) | Propylene homopolymer *1 (100) |
| Vinyl monomer (part by weight) | Styrene *2 (20) | Styrene *2 (10) | Styrene *2 (5) |
| Radical polymerization initiator (part by weight) | α,α'-bis(t-butylperoxy-m-isopropyl)benzene *3 (3) | α,α'-bis(t-butylperoxy-m-isopropyl)benzene *3 (1.5) | α,α'-bis(t-butylperoxy-m-isopropyl)benzene *3 (1) |

*1 Product of Sumitomo Kagaku Kogyo Kabushiki Kaisha, HIPOL B200P, Melt flow index at 230° C.: 0.5 g/10
*2 Product of Wako Junyaku Kogyo Kabushiki Kaisha, (special grade)
*3 Product of Nippon Yushi Kabushiki Kaisha, PERBUTYL P, 1 minute half-life temperature 175° C.

TABLE 2-(1)

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Peak temperature on DSC chart of raw polypropylene resin (° C.) | 160 | 160 | 160 | 160 | 160 | 143 | 149 | 160 | 160 |
| Peak temperature on DSC chart of modified polypropylene resin (° C.) | 147 | 144 | 157 | 147 | 146 | 130 | 135 | 148 | 147 |
| Weight average molecular weight of modified polypropylene resin | 628000 | 410000 | 710000 | 393000 | 800000 | 400000 | 400000 | 395000 | 700000 |
| Parts by weight of aromatic vinyl chains grafted on one part by weight of modified polypropylene resin | 0.062 | 0.050 | 0.064 | 0.077 | 0.070 | 0.060 | 0.080 | 0.030 | 0.083 |
| Weight average molecular weight of grafted aromatic vinyl chains | 8800 | 4000 | 14000 | 7000 | 9000 | 8000 | 6000 | 2500 | 4300 |
| Average number of grafted aromatic vinyl chains | 4.4 | 5.1 | 3.1 | 4.3 | 6.2 | 3.0 | 5.3 | 4.7 | 13.5 |
| Branching-parameter (g') | 0.24 | 0.30 | 0.61 | 0.29 | 0.20 | 0.21 | 0.49 | 0.55 | 0.10 |
| Specific elongational viscosity ratio (times) | 7.5 | 7.6 | 4.5 | 5.5 | 9.0 | 11.0 | 8.2 | 6.1 | 13.0 |

TABLE 2-(2)

| | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Peak temperature on DSC chart of raw polypropylene resin (° C.) | 160 | 160 | 160 | 160 | 160 | 160 | 160 | 160 | 160 |
| Peak temperature on DSC chart of modified polypropylene resin (° C.) | 145 | 144 | 150 | 158 | 150 | 155 | 152 | 154 | 154 |
| Weight average molecular weight of modified polypropylene resin | 500000 | 408000 | 390000 | 700000 | 500000 | 650000 | 530000 | 600000 | 580000 |
| Parts by weight of aromatic vinyl chains grafted on one part by weight of modified polypropylene resin | 0.122 | 0.047 | 0.027*1 0.013*2 | 0.030 | 0.070 | 0.065 | 0.069 | 0.070 | 0.071 |
| Weight average molecular weight of grafted aromatic vinyl chains | 11000 | 4100 | 2000 | 20000 | 4000 | 10000 | 3600 | 8000 | 8000 |
| Average number of grafted aromatic vinyl chains | 5.5 | 4.7 | 5.3 | 1.05 | 8.8 | 4.2 | 10.2 | 5.3 | 5.1 |
| Branching-parameter (g') | 0.21 | 0.45 | 0.59 | 0.451 | 0.27 | 0.40 | 0.33 | 0.37 | 0.29 |
| Specific elongational viscosity ratio (times) | 3.2 | 3.8 | 4.0 | 4.5 | 6.9 | 5.5 | 8.9 | 9.1 | 10.5 |

*1 Value obtained from a ratio of a peak height at around 1,370 $cm^{-1}$ derived from polypropylene to a peak height at around 700 $cm^{-1}$ derived from benzene ring through measurement with IR.
*2 Value obtained from a ratio of a peak height at around 1,370 $cm^{-1}$ derived from polypropylene to a peak height at around 1,730 $cm^{-1}$ derived from carbonyl group through measurement with IR.

TABLE 2-(3)

| | Ex. 19 | Ex. 20 | Ex. 21 |
|---|---|---|---|
| Peak temperature on DSC chart of raw polypropylene resin (° C.) | 160 | 160 | 160 |
| Peak temperature on DSC chart of modified polypropylene resin (° C.) | 148 | 148 | 153 |
| Weight average molecular weight of modified polypropylene resin | 623000 | 585000 | 592000 |
| Parts by weight of aromatic vinyl chains grafted on one part by weight of modified polypropylene resin | 0.070 | 0.045 | 0.051 |
| Weight average molecular weight of grafted aromatic vinyl chains | 6500 | 4300 | 3200 |
| Average number of grafted aromatic vinyl chains | 6.7 | 6.1 | 5.7 |
| Branching-parameter (g') | 0.21 | 0.35 | 0.43 |
| Specific elongational viscosity ratio (times) | 7.8 | 7.2 | 5.1 |

TABLE 3-(1)

| Results of evaluation | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Apparent density (g/cm³) | 0.029 | 0.030 | 0.034 | 0.027 | 0.025 | 0.030 | 0.027 | 0.035 | 0.038 | 0.025 |
| Expansion ratio (times) | 31 | 30 | 26 | 33 | 36 | 30 | 33 | 26 | 24 | 36 |
| Closed cell content (%) | 70 | 79 | 63 | 83 | 67 | 80 | 81 | 60 | 79 | 58 |
| Thickness (mm) | 20 | 20 | 18 | 21 | 22 | 19 | 20 | 15 | 15 | 24 |
| External appearance | ◯ | ◯ | ◯ | ◯ | ◯ | ◯ | ◯ | ◯ | ◯ | ◯ |

TABLE 3-(2)

| Results of evaluation | Ex. 11 | Ex. 12 | Ex. 13 | Ex. 14 | Ex. 15 | Ex. 16 | Ex. 17 | Ex. 18 |
|---|---|---|---|---|---|---|---|---|
| Apparent density (g/cm$^3$) | 0.038 | 0.040 | 0.035 | 0.029 | 0.035 | 0.027 | 0.027 | 0.027 |
| Expansion ratio (times) | 24 | 23 | 26 | 31 | 26 | 33 | 33 | 33 |
| Closed cell content (%) | 60 | 56 | 55 | 69 | 57 | 75 | 60 | 80 |
| Thickness (mm) | 16 | 15 | 16 | 21 | 16 | 22 | 21 | 21 |
| External appearance | ◯ | ◯ | ◯ | ◯ | ◯ | ◯ | ◯ | ◯ |

TABLE 4

| Results of evaluation | Ex. 19 | Ex. 20 | Ex. 21 |
|---|---|---|---|
| Apparent density (g/cm$^3$) | 0.030 | 0.032 | 0.035 |
| Expansion ratio (times) | 30 | 28 | 26 |
| Closed cell content (%) | 80 | 78 | 70 |
| Thickness (mm) | 40 | 40 | 40 |
| Diameter of cell ($\mu$m) | 0.5 | 0.6 | 0.7 |
| External appearance | ◯ | ◯ | ◯ |

EXAMPLE 22

The pelletized modified polypropylene resin used in the present invention could be obtained by melt-extruding the same materials as in Example 1 in the same manner as in Example 1 to give pellets of the modified polypropylene resin, and then melt-extruding the obtained pellets again under the same conditions as in Example 1 by using the same melt-extruder as in Example 1.

Characteristics of the obtained pellets of the modified polypropylene resin were evaluated in the same manner as in Example 1. A peak temperature on the DSC chart of the modified polypropylene resin was 147° C., a weight average molecular weight of the modified polypropylene resin was 595,000, parts by weight of the aromatic vinyl chains grafted on one part by weight of the modified polypropylene resin was 0.064, a weight average molecular weight of the grafted aromatic vinyl chains was 1,400, an average number of the grafted aromatic vinyl chains was 28.5 and a branching-parameter (g') was 0.26.

By using those pellets of the modified polypropylene resin, board-like foamed article could be obtained in the same manner as in Example 1.

An apparent density, closed cell content, thickness and external appearance of the obtained board-like foamed article were evaluated in the same manner as in Example 1. The apparent density was 0.032 g/cm$^3$, the expansion ratio was 28 times, the closed cell content was 56%, thickness was 17 mm and the external appearance was evaluated as "◯".

COMPARATIVE EXAMPLE 1

A foamed article was prepared in the same manner as in Example 1 except that the propylene homopolymer (NOBLEN D501 available from Sumitomo Kagaku Kogyo Kabushiki Kaisha) was not modified (the propylene homopolymer was expanded as it was).

An apparent density, closed cell content, thickness and external appearance of the obtained foamed article were evaluated in the same manner as in Example 1. The apparent density was 0.280 g/cm$^3$, the expansion ratio was 3.2 times, the closed cell content was 21%, the thickness was 5 mm and the external appearance was evaluated as "×".

A peak temperature on the DSC chart of the propylene homopolymer (the pellets obtained by melt-extruding), a weight average molecular weight and a branching-parameter were measured in the same manner as in Example 1. The peak temperature on the DSC chart was 160° C., the weight average molecular weight was 847,000, and the branching-parameter was 1.00.

COMPARATIVE EXAMPLE 2

A foamed article was obtained in the same manner as in Comparative Example 1 except that instead of the propylene homopolymer (NOBLEN D501 available from Sumitomo Kagaku Kogyo Kabushiki Kaisha), other propylene homopolymer (NOBLEN Z101A available from Sumitomo Kagaku Kogyo Kabushiki Kaisha, melt flow index at 230° C.: 20 g/10 min) was used. An apparent density, closed cell content, thickness and external appearance of the obtained foamed article were evaluated in the same manner as in Example 1. The apparent density was 0.421 g/cm$^3$, the expansion ratio was 2.1 times, the closed cell content was 30%, the thickness was 15 mm and the external appearance was evaluated as "×".

A branching-parameter (g') and peak temperature on the DSC chart of the propylene homopolymer (the pellets obtained by melt-extruding) were measured in the same manner as in Example 1. The branching-parameter (g') was 1.00, and the peak temperature on the DSC chart was 160° C.

From the results as mentioned above, it is seen that while the board-like foamed article prepared by using the modified polypropylene resin of the present invention has a high closed cell content and an excellent external appearance, the foamed article prepared by using the propylene homopolymer has a low expansion ratio, a low closed cell content, a thickness less than desired, and not so good external appearance.

EXAMPLE 23

A foamed article was melt-extruded by using the same modified polypropylene resin obtained in Example 1 and the same foaming agent used in Example 1 in an amount of 5 parts by weight on the basis of 100 parts by weight of the modified polypropylene resin and changing the dies of the tandem type extruder of Example 1 to circular dies having a diameter of 75 mm and a thickness of 0.2 mm. Immediately after melt-extruded, the obtained foamed article was fed to a water-cooled mandrel having a diameter of 202 mm, and then stretched and cooled to give a foamed article in the form of a cylinder. This foamed article was cut open with a cutter to give a foamed article in the form of a sheet. Kind and amount of a blend oil and a nucleating agent for the expansion, a method of mixing thereof to the modified polypropylene resin, setting conditions such as a set temperature of the tandem type extruder, a method of mixing the foaming agent, and the like were the same as in Example 1.

An apparent density, expansion ratio, closed cell content and external appearance of the obtained foamed sheet were evaluated in the same manner as in Example 1. The results are shown in Table 5.

EXAMPLE 24

A foamed sheet was obtained in the same manner as in Example 23 except that the same modified polypropylene resin obtained in Example 2 was used instead of the modified polypropylene resin obtained in Example 1. The obtained foamed sheet was evaluated in the same manner as in Example 23. The results are shown in Table 5.

EXAMPLE 25

A foamed sheet was obtained in the same manner as in Example 23 except that the same modified polypropylene resin obtained in Example 3 was used instead of the modified polypropylene resin obtained in Example 1. The obtained foamed sheet was evaluated in the same manner as in Example 23. The results are shown in Table 5.

EXAMPLE 26

A foamed sheet was obtained in the same manner as in Example 23 except that the same modified polypropylene resin obtained in Example 4 was used instead of the same modified polypropylene resin obtained in Example 1. The obtained foamed sheet was evaluated in the same manner as in Example 23. The results are shown in Table 5.

COMPARATIVE EXAMPLE 3

A foamed sheet was obtained in the same manner as in Example 23 except that instead of a modified polypropylene resin, a propylene homopolymer (NOBLEN H501 available from Sumitomo Kagaku Kogyo Kabushiki Kaisha, melt flow index at 230° C. 3.5 g/10 min) was used. The obtained foamed sheet was evaluated in the same manner as in Example 23. The results are shown in Table 5.

A branching-parameter (g') and peak temperature on the DSC chart of the pellets obtained by melt-kneading the propylene homopolymer were measured in the same manner as in Example 1. The branching-parameter (g') was 1.00, and the peak temperature on the DSC chart was 160° C.

TABLE 5

| Results of evaluation | Ex. 23 | Ex. 24 | Ex. 25 | Ex. 26 | Com. Ex. 3 |
|---|---|---|---|---|---|
| Apparent density (g/cm$^3$) | 0.10 | 0.09 | 0.12 | 0.09 | 0.17 |
| Expansion ratio (times) | 9 | 10 | 7.5 | 10 | 5.3 |
| Closed cell content (%) | 72 | 81 | 66 | 87 | 26 |
| External appearance | ◯ | ◯ | ◯ | ◯ | × |

COMPARATIVE EXAMPLE 4

Extrusion foaming was conducted in the same manner as in Example 23 except that instead of a modified polypropylene resin, a propylene homopolymer (NOBLEN D501 available from Sumitomo Kagaku Kogyo Kabushiki Kaisha, melt flow index at 230° C. 0.4 g/10 min) was used. Stretchability of the obtained extrudate was not good and the extrudate was cut during stretching, and therefore, could not be fed to the mandrel.

From the results as mentioned above, it is seen that while the foamed sheet prepared by using the modified polypropylene resin of the present invention has a high closed cell content and good external appearance, the foamed sheet prepared by using propylene homopolymer has a low closed cell content and not so good external appearance.

Also it is seen that in case where foamed sheets are prepared by using propylene homopolymer, in some cases stretchability of the obtained foamed sheets is worse and desired stretching cannot be carried out.

EXAMPLE 27

An amount of 100 parts by weight of the same modified polypropylene resin obtained in Example 1 and 5 parts by weight of azodicarbonamide (VINYHOL AC available from Eiwa Kasei Kabushiki Kaisha) were hand-blended and then kneaded by heating at 180° C. in an eight-inch mill roll to give a rolled sheet. The obtained rolled sheet was cut and put between the steel plates for cooling to give a 0.5 mm thick sheet. This sheet was heated to 230° C. to be foamed to give a foamed article. An apparent density, expansion ratio, closed cell content and external appearance of the obtained foamed article were evaluated in the same manner as in Example 1. The results are shown in Table 6.

COMPARATIVE EXAMPLE 5

A foamed article was obtained in the same manner as in Example 27 except that instead of a modified polypropylene polymer, a propylene homopolymer (NOBLEN H501 available from Sumitomo Kagaku Kogyo Kabushiki Kaisha, melt flow index at 230° C. 3.5 g/10 min) was used. The obtained foamed article was evaluated in the same manner as in Example 27. The results are shown in Table 6.

TABLE 6

| Results of evaluation | Ex. 27 | Com. Ex. 5 |
|---|---|---|
| Apparent density (g/cm$^3$) | 0.10 | 0.15 |
| Expansion ratio (times) | 9 | 6 |
| Closed cell content (%) | 61 | 19 |
| External appearance | ◯ | × |

From the results as mentioned above, it is seen like the case of the extrusion foaming, that while the foamed article prepared by using the modified polypropylene resin of the present invention has a high closed cell content and good external appearance, the foamed article prepared by using propylene homopolymer has a low closed cell content and not so good external appearance.

EXAMPLE 28

A board-like foamed article was prepared in the same manner as in Example 19 by using the same modified polypropylene resin obtained in Example 19 except that as the foaming agent, 20 parts by weight of an isobutane gas (100% isobutane) was used on the basis of 100 parts by weight of the modified polypropylene resin. The obtained board-like foamed article was evaluated in the same manner as in Example 19.

As a result, an apparent density was 0.018 g/cm$^3$, an expansion ratio was 50 times, a closed cell content was 75%, a thickness was 50 mm, a diameter of the cell was 0.5 μm, and external appearance was evaluated as "603".

EXAMPLE 29

A board-like foamed article was prepared in the same manner as in Example 19 by using the same modified polypropylene resin obtained in Example 19 except that as the foaming agent, 3 parts by weight of an isobutane gas (100% isobutane) was used on the basis of 100 parts by weight of the modified polypropylene resin. The obtained board-like foamed article was evaluated in the same manner as in Example 19.

As a result, an apparent density was 0.015 g/cm³, an expansion ratio was 60 times, a closed cell content was 80%, a thickness was 30 mm, a diameter of the cell was 0.5 μm, and external appearance was evaluated as "○".

COMPARATIVE EXAMPLE 6

A foamed article was prepared in the same manner as in Example 19 except that as the aromatic vinyl monomer, 2 parts by weight of styrene monomer and as the radical polymerization initiator, 0.2 part by weight of α, α'-bis(t-butylperoxy-m-isopropylbenzene) were used. The obtained foamed article was evaluated in the same manner as in Example 19.

As a result, an apparent density was 0.35 g/cm³, an expansion ratio was 2.6 times, a closed cell content was 15%, a thickness was 3 mm, a diameter of the cell was 5.2 μm, and external appearance was evaluated as "○".

The specific elongational viscosity ratio of the polypropylene resin so-modified in the manner mentioned above was 1.7.

COMPARATIVE EXAMPLE 7

A foamed article was prepared in the same manner as in Example 19 except that instead of the modified polypropylene resin, propylene homopolymer (HIPOL B200P available from Mitsui Sekiyu Kagaku Kogyo Kabushiki Kaisha, melt flow index at 230° C.: 0.5 g/10 min) was used. The obtained foamed article was evaluated in the same manner as in Example 19.

As a result, an apparent density was 0.40 g/cm³ and an expansion ratio was 2.2 times, and thus a high expansion ratio could not be obtained. A closed cell content was low, i.e. 5%, and the surface was rough and not smooth.

Figure 4:
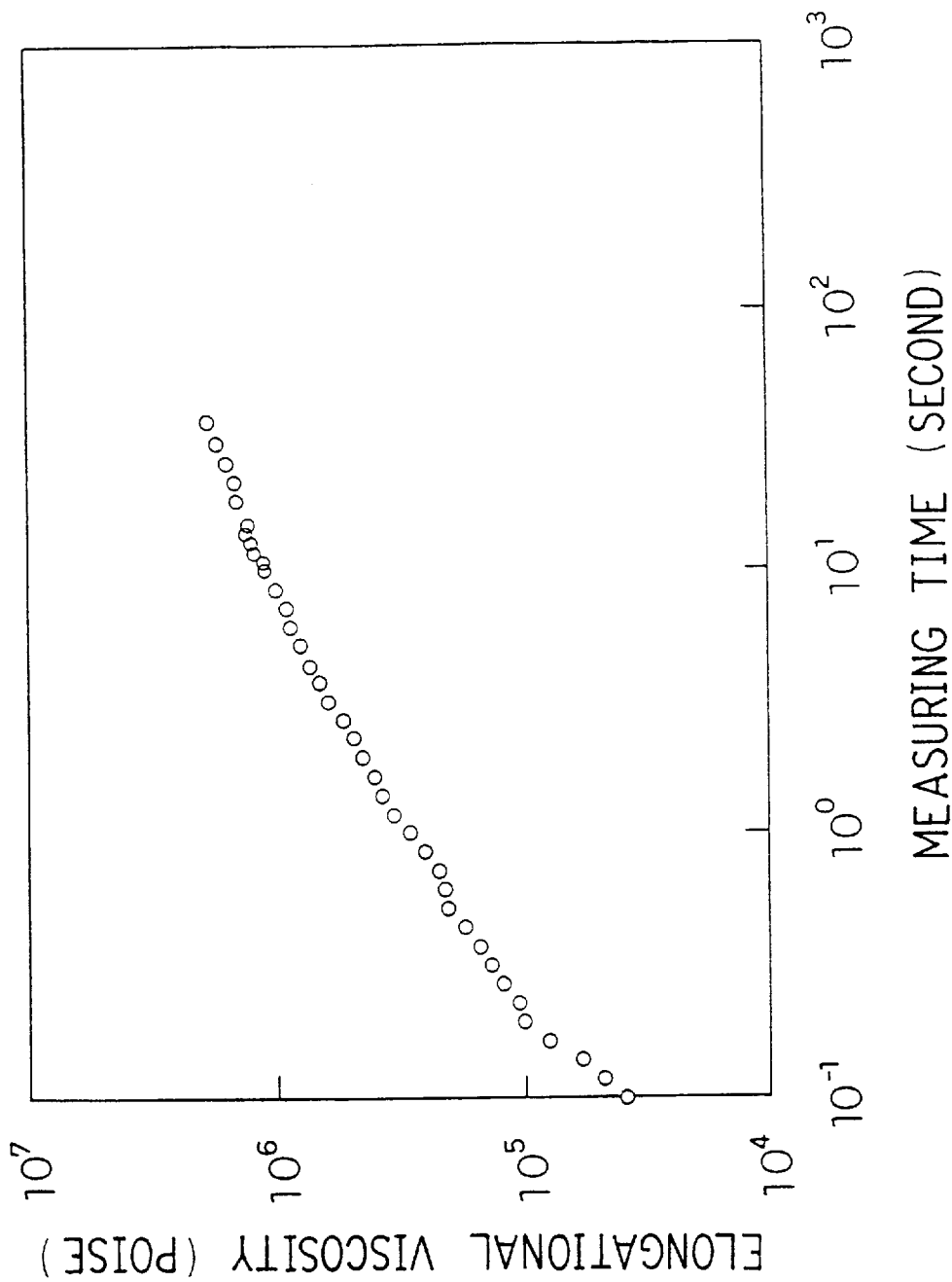
FIG. 4 is a graph showing a relation of an elongational viscosity of the modified polypropylene resin of Comparative Example 7 in the molten state and a measuring time (strain rate).

FIG. 4 shows a relation of an elongational viscosity of propylene homopolymer and a measuring time in Comparative Example 7. In FIG. 4, the elongational viscosity increases slowly with a lapse of time (increase in strain), but there is seen no rapid increase.

INDUSTRIAL APPLICABILITY

The modified polypropylene resin used in the resent invention has an average number of the grafted aromatic vinyl chains of not less than 1 per one molecule of the resin polymer and a weight average molecular weight of the grafted aromatic vinyl chains of not less than 200. Such a modified polypropylene resin can be elastically deformed greatly at melting, and therefore, a foamed article comprising that modified polypropylene resin can have a high closed cell content, high expansion ratio and good external appearance.

Also since the above-mentioned modified polypropylene resin has a characteristic such that the elongational viscosity thereof in the molten state is increased rapidly with increase of strain, it is easy to obtain a foamed article having a higher closed cell content, a higher expansion ratio and good external appearance.

Also according to the preparation process of the present invention, in case where the raw polypropylene resin is modified, high rigidity, chemical resistance, impact resistance and heat resistance which the raw polypropylene resin possesses are not lowered below the respective practicable levels, and therefore a foamed article comprising the obtained modified polypropylene resin is excellent in rigidity, chemical resistance, impact resistance and heat resistance.

Also according to the present invention, the above-mentioned modified polypropylene resin can be prepared by a relatively easy method such that graft copolymerization reaction is conducted by melt-kneading a polypropylene resin and an aromatic vinyl monomer in the presence of a radical polymerization initiator, and therefore, the foamed article being relatively low in price and having excellent characteristics can be obtained.

We claim:

1. A foamed extrudate comprising a modified polypropylene resin which is a grafted copolymer of a polypropylene resin and an aromatic vinyl monomer, wherein the aromatic vinyl monomer added is in an amount from 0.1 to 40 parts by weight for 100 parts by weight of the raw polypropylene resin, the average number of grafted aromatic vinyl chains in one molecule of said graft copolymer is at least 1, the weight average molecular weight of said aromatic vinyl chains is not less than 200, and the elongational viscosity ηe (poise), which is defined below, varies with measuring time t (second) in the manner described below:

$$\eta e = \frac{\sigma}{\gamma}$$

wherein σ is a stress per cross-sectional area (dynes/cm²), and γ is a strain rate (/sec) represented by the following equation:

$$\gamma = \frac{1}{L} \cdot \frac{dL}{dt}$$

wherein L is a length of a sample (cm), and
when a graph is plotted wherein the abscissa represents a logarithm of t and the ordinate represents a logarithm of ηe, in the resulting curve, a gradient ratio of a straight line drawn from a slowly increasing portion at an initial stage to a straight line drawn from a drastically increasing portion with a lapse of time is not less than 2.

2. The foamed extrudable according to claim 1 wherein a branching-parameter (g') of said modified polypropylene resin is less than 1.

3. The foamed extrudable according to claim 1 which has an apparent density of 0.01 to 0.3 g/cm³ and a thickness of 5 to 100 mm.

4. The foamed extrudate according to any of claims 1, 2 and 3, which has a closed cell content of at least 55%.

* * * * *